(12) United States Patent
Di Maria

(10) Patent No.: US 11,464,354 B2
(45) Date of Patent: Oct. 11, 2022

(54) SYSTEM FOR DISPENSING INDIVIDUAL SERVINGS OF A BEVERAGE

(71) Applicant: Giuseppe Di Maria, Smithfield (AU)

(72) Inventor: Giuseppe Di Maria, Smithfield (AU)

( * ) Notice: Subject to any disclaimer, the term of this patent is extended or adjusted under 35 U.S.C. 154(b) by 873 days.

(21) Appl. No.: 16/335,868

(22) PCT Filed: Oct. 20, 2016

(86) PCT No.: PCT/AU2016/050988
§ 371 (c)(1),
(2) Date: Mar. 22, 2019

(87) PCT Pub. No.: WO2017/066837
PCT Pub. Date: Apr. 27, 2017

(65) Prior Publication Data
US 2019/0254465 A1    Aug. 22, 2019

(51) Int. Cl.
*G07F 13/06* (2006.01)
*A47J 31/40* (2006.01)
(Continued)

(52) U.S. Cl.
CPC ........... *A47J 31/404* (2013.01); *A23L 2/39* (2013.01); *A47J 31/40* (2013.01); *A47J 31/41* (2013.01);
(Continued)

(58) Field of Classification Search
CPC .......... A47J 31/404; A47J 31/41; A47J 31/52; A47J 43/042; G07F 13/06; G07F 13/10;
(Continued)

(56) References Cited

U.S. PATENT DOCUMENTS

| 4,893,939 A | * | 1/1990 | Burk | B01F 29/83 366/605 |
| 8,007,847 B2 | * | 8/2011 | Biderman | A47J 31/401 426/231 |

(Continued)

FOREIGN PATENT DOCUMENTS

| WO | 2010/034722 | 4/2010 |
| WO | 2014/096017 | 6/2014 |

OTHER PUBLICATIONS

International Search Report for PCT/AU2016/050988 dated Feb. 6, 2017, 6 pages.

*Primary Examiner* — Timothy R Waggoner
(74) *Attorney, Agent, or Firm* — Nixon & Vanderhye P.C.

(57) ABSTRACT

A system for dispensing individual servings of a beverage, said system comprising: a beverage receptacle holder adapted for retaining a beverage receptacle; a plurality of dry formulation beverage mixtures; selection means for selecting one or more of said beverage mixtures for said beverage; dispensing means for measuring an individual serving quantity of said selected one or more beverage mixtures and for depositing said individual serving quantity into said beverage receptacle; fluid dispensing module for depositing an individual serving quantity of a selected fluid into said beverage receptacle; means for sealing said beverage receptacle; and means for mixing said individual serving quantity of said beverage mixture and said fluid to provide a mixed beverage for dispensing.

16 Claims, 29 Drawing Sheets

(51) Int. Cl.
| | |
|---|---|
| *A23L 2/39* | (2006.01) |
| *A47J 31/41* | (2006.01) |
| *A47J 31/52* | (2006.01) |
| *B65D 77/20* | (2006.01) |
| *A47J 31/44* | (2006.01) |
| *B01F 23/53* | (2022.01) |
| *B01F 29/34* | (2022.01) |
| *B01F 33/841* | (2022.01) |
| *B01F 101/14* | (2022.01) |

(52) U.S. Cl.
CPC ............... *A47J 31/44* (2013.01); *A47J 31/52* (2013.01); *B01F 23/53* (2022.01); *B01F 29/34* (2022.01); *B01F 33/841* (2022.01); *B65D 77/20* (2013.01); *G07F 13/06* (2013.01); *A23V 2002/00* (2013.01); *B01F 2101/14* (2022.01)

(58) Field of Classification Search
CPC .... G07F 13/065; G07F 11/1653; B01F 29/34; B01F 29/30
See application file for complete search history.

(56) References Cited

U.S. PATENT DOCUMENTS

| | | | |
|---|---|---|---|
| 2004/0026447 A1* | 2/2004 | Badin | G07F 13/065 222/63 |
| 2011/0052764 A1* | 3/2011 | Bulgin | A47J 31/404 700/285 |
| 2013/0160658 A1* | 6/2013 | Torrisi | A23N 1/02 99/511 |
| 2014/0251494 A1 | 9/2014 | Stieger et al. | |
| 2020/0246768 A1* | 8/2020 | Klein | B01F 33/35 |
| 2020/0376451 A1* | 12/2020 | Damar | B01F 29/15 |

* cited by examiner

SECTION A-A

SECTION AA-AA

SECTION C-C

DETAIL D

SECTION E-E

DETAIL I

SECTION G-G

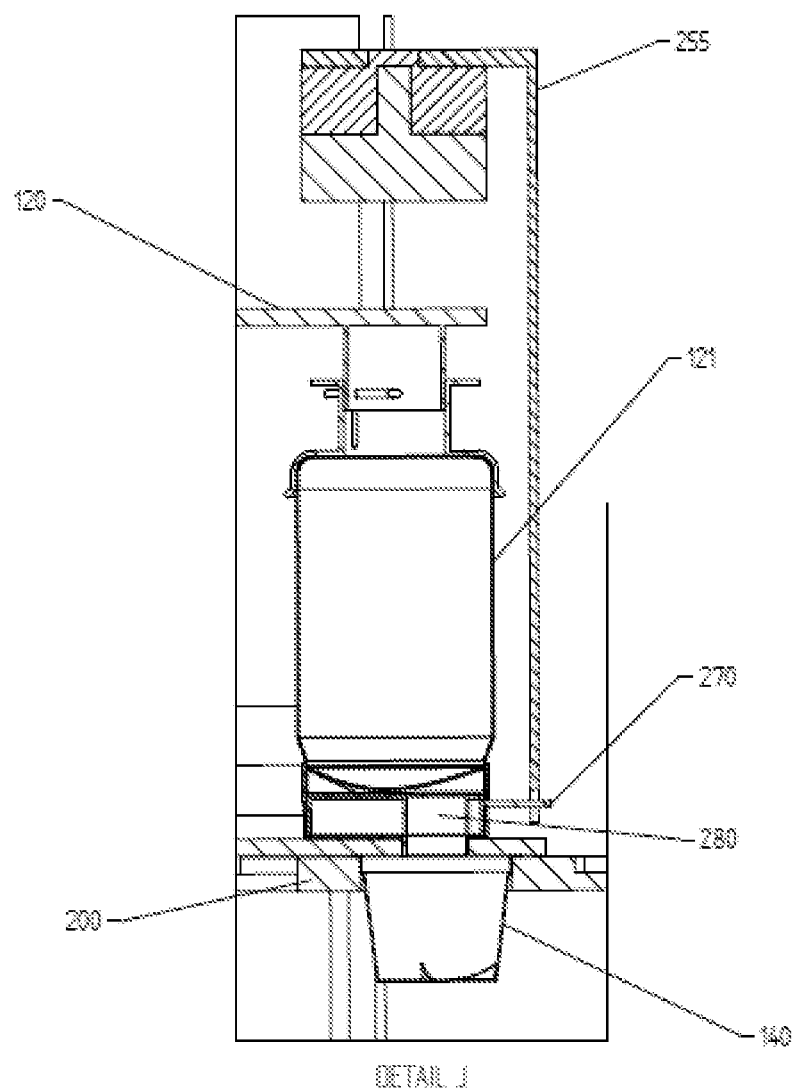

SECTION N-N

SYSTEM FOR DISPENSING INDIVIDUAL SERVINGS OF A BEVERAGE

This application is the U.S. national phase of International Application No. PCT/AU2016/050988 filed Oct. 20, 2016 which designated the U.S., the entire contents of which are hereby incorporated by reference.

FIELD OF THE INVENTION

The present invention relates to apparatus for dispensing a beverage and in particular to an apparatus adapted for selection and mixing of a dry mix beverage formulation and a fluid and dispensing a mixed beverage according to the selected dry mix formulation.

The invention has been developed primarily for use in methods and systems for an apparatus adapted for selection of a dry mix beverage formulation, mixing the selected formulation and dispensing a mixed beverage according to the selected dry mix formulation and will be described hereinafter with reference to this application. However, it will be appreciated that the invention is not limited to this particular field of use.

BACKGROUND

Any discussion of the background art throughout the specification should in no way be considered as an admission that such background art is prior art nor that such background art is widely known or forms part of the common general knowledge in the field in Australia or worldwide.

Known beverage dispensing apparatus or vending machines can be one of several types. They can include those that only provide pre-mixed beverages in sealed beverage containers such as bottles (typically plastic) or cans. Such vending machines are limited in the beverages they can dispense by the storage space within the apparatus for such pre-mixed, sealed beverages. Beverage selection can become problematic if a particular beverage is extremely popular at a particular site location of the apparatus, for example, post-workout beverages in a vending machine located at a gymnasium or fitness centre. The vending machine is generally required to provide a range of options of beverages for selection by a customer which disadvantageously limits the storage capacity of the vending machine for the popular beverages thus requiring multiple vending machines to be provided.

Other types of beverage dispensing apparatus include the hot beverage type vending machines. Typically they dispense a cup directly into a dispensing zone and into which are delivered fixed quantities of selected ingredients such as coffee, sugar and powdered milk. The hot water is then dispensed directly into the cup in the dispensing zone. The ingredients having been chosen using a selection means and typically simple buttons that designate the beverage and other ingredients. These types of machines do not mix the combination of ingredients and they are not provided with a sealed lid. This of course pose problems with the actual beverage which can in some situations be watery at the top of the beverage due to inadequate mixing further resulting in beverage that is very strong in the bottom of the cup. Additionally as these types of vending machines do not seal the beverage the user in attempting to collect it from the dispensing station frequently spills the contents, also pose injury risks where excess hot water can scald the user when retrieving the beverage from the dispensing zone. Other problems also arise with these types of vending machines which have limited storage capacity for cups and beverage mixtures, and limited ability to select a more complex beverage with multiple ingredients.

SUMMARY OF THE INVENTION

It is an aim of the present invention to overcome or ameliorate at least one or more of the disadvantages of the prior art, or to provide a useful alternative.

According to a first aspect of the present invention, there is provided a system for dispensing individual servings of a beverage. The system may comprise a beverage receptacle holder adapted for retaining a beverage receptacle (cup). The system may further comprise a plurality of dry formulation beverage mixtures. The system may further comprise selection means for selecting one or more of the beverage mixtures for the beverage. The selection means may comprise a user interface adapted to display to the user the beverage selections available from the system. The selection means may alternatively comprise a plurality of user controls adapted for selection of a particular one of the beverage selections available from the system. The system may further comprise dispensing means for measuring an individual serving quantity of said beverage mixture and for depositing said individual serving quantity into said individual beverage receptacle. The dispensing means may comprise a carousel adapted to retain a plurality of dry mix beverage formulations. The dispensing means may further comprise a dry mixing chamber for mixing a plurality of selected beverage formulations. The dispensing means may comprise a mixing agitator disposed in the dry mixing chamber for agitating and thus mixing the selected dry mix beverage formulations within the dry mixing chamber to provide an individual serving quantity of the selected beverage formulations. The dispensing means may be thermally controlled such that the selected dry mix beverage formulations are prevented from adhering to the surface of the dry mix chamber and/or the agitator. The mixing agitator may be a propeller. The system may further comprise a fluid dispensing module for depositing an individual serving quantity of a selected fluid into said beverage receptacle. The fluid may be water. The fluid may be purified water. The system may further comprise means for sealing the beverage receptacle. The system may further comprise means for mixing the individual serving quantity of said beverage mixture with the fluid to provide a mixed beverage.

According to a particular arrangement of the first aspect, there is provided a system for dispensing individual servings of a beverage, said system comprising: a beverage receptacle holder adapted for retaining a beverage receptacle; a plurality of dry formulation beverage mixtures; selection means for selecting one or more of the beverage mixtures for the beverage; dispensing means for measuring an individual serving quantity of the selected beverage mixtures and for depositing said individual serving quantity into said individual beverage receptacle; fluid dispensing module for depositing an individual serving quantity of a selected fluid into the beverage receptacle; means for sealing the beverage receptacle; and means for mixing the individual serving quantity of the beverage mixture and the fluid to provide a mixed beverage.

Preferably the selection means comprises a user interface. Preferably the user interface provides means for a user to select one or more beverage mixtures from a plurality of available beverage mixtures. If a plurality of beverage fluids are available, the selection means may further comprise means for selecting a beverage fluid from the plurality of available fluids. Preferably the user interface further provides for selecting a payment option to pay for their beverage from the group of payment options selected from the group consisting of pre-paid cards, membership cards, debit cards, credit cards, pay wave cards and software application payment (apps) installed on a smart device. Preferably the payment option can further include user beverage preferences for selecting a pre-set beverage option and recorded on the payment option.

Preferably the beverage mixture can be selected from the group comprising one or more of: a pre-workout beverage formulation; a post-workout beverage formulation; a flavouring, or powdered milk product.

Preferably the beverage fluid may comprise water and preferably purified water.

Preferably the dispensing means for measuring and dispensing an individual serving quantity of said selected beverage mixtures can include dispensing canisters. Preferably the dispensing canisters are adapted to dispense pre-determined quantities of beverage mixtures to the beverage receptacle.

Preferably the beverage receptacle holder comprises a recess adapted to receive a beverage receptacle. Preferably the beverage receptacle holder comprises an inner wall spaced from an outer wall. Preferably the inner wall comprises a plurality of apertures adapted for airflow through the inner wall into the space between the inner and outer walls. Preferably the beverage receptacle holder is fluidly connected to a vacuum air pump adapted to draw air through the plurality of apertures in the inner wall of the beverage receptacle holder. In use, the vacuum pump is preferably adapted to retain a beverage receptacle in the recess under vacuum pressure. Preferably in use, a beverage receptacle within the recess is retained therein via vacuum pressure due to operation of the air pump.

According to a second aspect of the invention, there is provided a beverage receptacle adapted for automated mixing of a serving quantity of a dry formulation beverage mixture with a serving quantity of a fluid, the beverage receptacle comprising: a base; a substantially cylindrical body defining an inner space adapted to retain a fluid beverage therein; a plurality of mixing formations disposed within the cylindrical body and fixedly attached to an inner wall of the body and to an inner surface of the base such that, upon deposition of a serving quantity of a dry formulated beverage mixture and a serving quantity of a fluid within the body and rotation of the beverage receptacle about a central, vertically disposed axis thereof, the plurality of mixing formations provide a mixing agitation within the body thereby to mix the dry formulated beverage mixture with the fluid to obtain a mixed beverage.

Preferably the mixing formations comprise fins disposed within the body of the beverage receptacle. Alternatively the mixing formations comprise projections extending into the inner space from the inner wall of the body. Preferably the mixing formation being adapted to provide mixing agitation to a dry formulation mixture and fluid disposed within the inner space of the beverage receptacle.

According to a third aspect of the invention there is provided a beverage mixing arrangement comprising: a primary shaft, vertically disposed and adapted for high speed rotation or agitation about a central axis; a secondary shaft adapted to be selectively coupled to the primary shaft and adapted for high speed rotation or agitation about a central axis wherein the secondary shaft is concentrically disposed with respect to the primary shaft; a beverage receptacle holder according to the second aspect mounted to the primary shaft; wherein, in use, the beverage receptacle holder may be adapted to retain a beverage receptacle under vacuum suction, and the secondary shaft may be adapted to rotate or agitate said beverage receptacle holder thereby to mix dry and fluid phase ingredients retained in the beverage receptacle to provide a mixed beverage.

Preferably the secondary shaft is selectively magnetically coupled to the primary shaft. Preferably the secondary shaft is adapted to be coupled to the primary shaft with a selectable gearing ratio thereby to select the speed of rotation or agitation of the secondary shaft.

Preferably the mixing device is located on one or more guiding tracks such that the mixing device can be selectively moved into alignment with a dry phase ingredient dispensing apparatus and a fluid phase ingredient dispensing apparatus thereby to facilitate deposition of the dry and fluid phase ingredients into a beverage receptacle retained in the beverage receptacle holder.

Preferably the secondary shaft is adapted to move into a sealing position whereby a beverage receptacle retained in the beverage receptacle holder is able to be placed into sealing engagement with a sealing apparatus. In preferred arrangements, the sealing apparatus is adapted to descend from its rest position thereby to seal the cup prior to mixing Preferably the secondary shaft may be adapted to move vertically into the sealing position whereby a beverage receptacle retained in the beverage receptacle holder is placed into sealing engagement with a sealing apparatus.

In a fourth aspect of the invention there provided a system for dispensing individual servings of a beverage the system comprising:
 (a) a rotating beverage receptacle carousal adapted to receive and hold at least one beverage receptacle;
 (b) a receptacle nesting arrangement adapted to store a plurality of beverage receptacles for use in the system;
 (c) a selection means for selecting one or more fluids for said beverage and one or more beverage mixtures for said beverage;
 (d) a fluid dispensing apparatus adapted to deliver at least one fluid into said beverage receptacle;
 (e) a beverage mixture dispensing arrangement comprising a plurality of dispensing cartridges for dispensing an individual serving quantity of at least one beverage mixture into said beverage receptacle;
 (f) a heat sealing arrangement for sealing said beverage receptacle after said beverage receptacle has received both the beverage mixture and fluid;
 (g) a beverage receptacle holding arrangement;
 (h) a beverage mixing arrangement for mixing the dispensed beverage mixture and fluid to provide a mixed beverage;
 (i) a dispensing arrangement for dispensing the mixed beverage to a user.

Preferably the beverage receptacle is adapted for automated mixing of a serving quantity of a dry formulation beverage mixture with a serving quantity of a fluid, the beverage receptacle comprising: a base; a substantially cylindrical body defining an inner space adapted to retain a fluid beverage therein; a plurality of mixing formations disposed within the cylindrical body and fixedly attached to an inner wall of the body and to an inner surface of the base such that, upon deposition of a serving quantity of a dry formulated beverage mixture and a serving quantity of a fluid within the body and rotation of the beverage receptacle about a central, vertically disposed axis thereof, the plurality of mixing formations provide a mixing agitation within the body thereby to mix the dry formulated beverage mixture with the fluid to obtain a mixed beverage.

Preferably the mixing formations comprise fins dispose within the body of the receptacle. In an alternative embodiment the mixing formations comprise projections extending into the inner space from the inner wall of the body of the receptacle and are adapted to provide mixing agitation to a fluid and dry formulation mixture disposed within the inner space.

Preferably the beverage receptacle carousal is adapted to move the at least one beverage receptacle between the receptacle nesting arrangement, fluid dispensing apparatus, beverage mixture dispensing arrangement, heat sealing arrangement and beverage receptacle holding in that order.

Preferably the receptacle nesting arrangement comprises a plurality of receptacle storage holders adapted to deliver a single cup at a time to the receptacle beverage carousal.

Preferably the beverage mixture dispensing arrangement comprises a plurality of dispensing cartridges, preferably between 10 and 15 but not limited to this range.

Preferably the heat sealing arrangement for sealing said beverage receptacle, after said beverage receptacle has received both the beverage mixture and fluid, comprises heat sealing film and a combined heat sealing and cutting apparatus, whereby when the beverage receptacle containing the mixture of beverage ingredients and fluid is located to the heat sealing arrangement by the rotating beverage receptacle carousal, the heating sealing film is applied to the beverage receptacle on its upper rim and is sealed and cut by said combined heat sealing and cutting apparatus.

Preferably the selection means comprises a user interface. Preferably the user interface provides means for a user to select one or more beverage mixtures from a plurality of available beverage mixtures. If a plurality of beverage fluids are available, the selection means may further comprise means for selecting a beverage fluid from the plurality of available fluids.

The selection means preferably comprises a user interface, for example a touchscreen interface or the like, adapted to display to the user the beverages available from the vending machine system. The selection means may alternatively comprise a plurality of user-operable controls, such as, for example, selection buttons adapted for selection of a particular one of the beverage selections available from the system.

Preferably the user interface further provide for selecting a payment option to pay for their beverage from the group of payment options selected from the group consisting of pre-paid cards, membership cards, debit cards, credit cards, pay wave cards and software application payment (apps) installed on a smart device. Preferably the payment option can further include user beverage preferences for selecting a pre-set beverage option and recorded on the payment option.

Preferably the fluid delivered by the fluid dispensing apparatus is water, more preferably purified water.

Preferably the beverage receptacle holding arrangement comprises a recess adapted to receive a beverage receptacle. Preferably the beverage receptacle holder comprises an inner wall spaced from an outer wall. Preferably the inner wall comprises a plurality of apertures adapted for airflow through the inner wall into the space between the inner and outer walls. Preferably the beverage receptacle holder is fluidly connected to a vacuum air pump adapted to draw air through the plurality of apertures in the inner wall of the beverage receptacle holder. In use, the vacuum pump is preferably adapted to retain a beverage receptacle in the recess under vacuum pressure. Preferably in use, a beverage receptacle within the recess is retained therein via vacuum pressure due to operation of the air pump.

Preferably the beverage mixing arrangement for mixing the dispensed beverage mixture and fluid to provide a mixed beverage comprises: a primary shaft, vertically disposed and adapted for high speed rotation or agitation about a central axis; a secondary shaft adapted to be selectively coupled to the primary shaft and adapted for high speed rotation or agitation about a central axis wherein the secondary shaft is concentrically disposed with respect to the primary shaft; a beverage receptacle holder according to the second aspect mounted to the primary shaft; wherein, in use, the beverage receptacle holder may be adapted to retain a beverage receptacle under vacuum suction, and the secondary shaft may be adapted to rotate or agitate said beverage receptacle holder thereby to mix dry and fluid phase ingredients retained in the beverage receptacle to provide a mixed beverage.

Preferably the secondary shaft is selectively magnetically coupled to the primary shaft. Preferably the secondary shaft is adapted to be coupled to the primary shaft with a selectable gearing ratio thereby to select the speed of rotation or agitation of the secondary shaft. Preferably the primary and/or secondary shafts are adapted singularly or in cooperation with one another to move upwardly to deliver the sealed beverage receptacle to the dispensing cavity.

In use, once the beverage management system has mixed an individual serving quantity of one or more selected dry phase beverage formulations with a selected fluid phase ingredient, the system is adapted to dispense the mixed beverage to a user.

BRIEF DESCRIPTION OF THE DRAWINGS

Notwithstanding any other forms which may fall within the scope of the present invention, a preferred embodiment/preferred embodiments of the invention will now be described, by way of example only, with reference to the accompanying drawings in which:

FIG. 8C shows an enlarged view of section Z of cross section A-A of FIG. 8B, being a part of the cup nesting arrangement station and FIG. 8D showing the capture of a cup and FIG. 8E showing the captured cup.

FIG. 9C shows an enlarged view of section D of cross section C-C and which is at the fluid reservoir delivery station and where the cup is positioned to receive the fluid.

FIG. 10C shows an enlarged view of section 1 of cross section E-E and which illustrates the cup having been delivered to the beverage carousal station and where the beverage canister is closed.

FIGS. 11A, 118 and 11C show respectively a top schematic overview (FIG. 11A) of the alternative embodiment of the invention and where line G-G is a cross section line, the cross section being illustrated in FIG. 11B; FIG. 11C shows an enlarged view of section H of the cross section G-G and which illustrates the cup having been delivered to the beverage carousal station and where the beverage canister is still closed but viewed from a left perspective.

FIGS. 12A, 12B and 12C show respectively a top schematic overview (FIG. 12A) of the alternative embodiment of the invention and where line F-F is a cross section line, the cross section being illustrated in FIG. 12B; FIG. 12C shows an enlarged view of section J of the cross section F-F and where the canister has opened to dispense the mixture into the cup.

FIG. 13C showing an enlarged view of section X of the cross section K-K and where the cup has been delivered to the heat sealing station.

FIG. 14C shows an enlarged view of section M of the cross section L-L and where the cup has been heat sealed.

FIGS. 15C to 15F show an enlarged view of section O of cross section N-N in different operational modes.

DEFINITIONS

Figure 1:
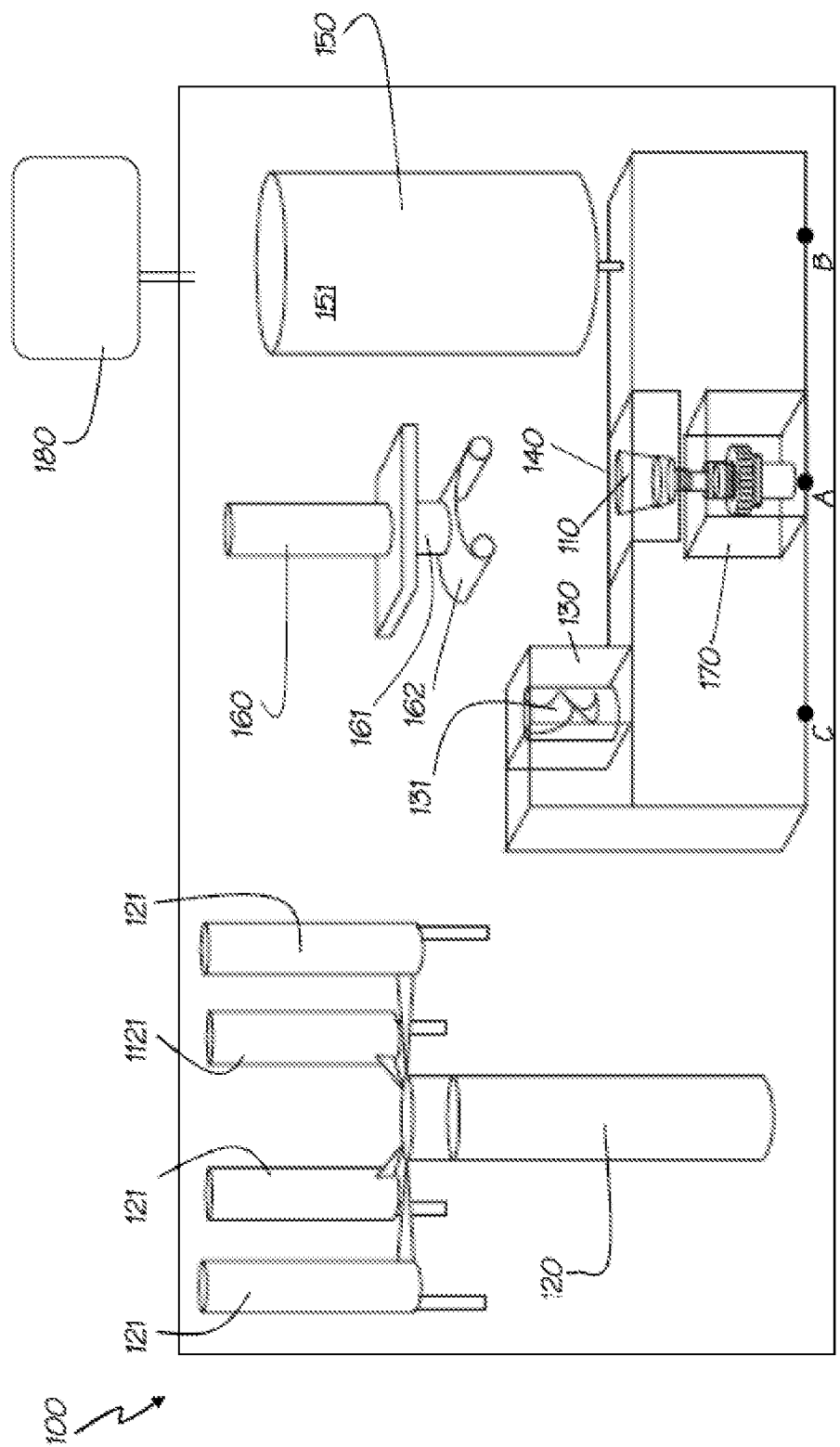
FIG. 1 shows a schematic overview of the beverage dispensing system in accordance with the present invention (vending machine) as disclosed herein.

The following definitions are provided as general definitions and should in no way limit the scope of the present invention to those terms alone, but are put forth for a better understanding of the following description.

Unless defined otherwise, all technical and scientific terms used herein have the same meaning as commonly understood by those of ordinary skill in the art to which the invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

For the purposes of the present invention, the following terms are defined below.

The articles "a" and "an" are used herein to refer to one or to more than one (i.e. to at least one) of the grammatical object of the article. By way of example, "an element" refers to one element or more than one element.

The term "about" is used herein to refer to quantities that vary by as much as 30%, preferably by as much as 20%, and more preferably by as much as 10% to a reference quantity. The use of the word 'about' to qualify a number is merely an express indication that the number is not to be construed as a precise value.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Any one of the terms: "including" or "which includes" or "that includes" as used herein is also an open term that also means including at least the elements/features that follow the term, but not excluding others. Thus, "including" is synonymous with and means "comprising".

Although any methods and materials similar or equivalent to those described herein can be used in the practice or testing of the present invention, preferred methods and materials are described. It will be appreciated that the methods, apparatus and systems described herein may be implemented in a variety of ways and for a variety of purposes. The description here is by way of example only.

As used herein, the term "exemplary" is used in the sense of providing examples, as opposed to indicating quality. That is, an "exemplary embodiment" is an embodiment provided as an example, as opposed to necessarily being an embodiment of exemplary quality for example serving as a desirable model or representing the best of its kind.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and (optionally including other elements); etc.

As used herein in the specification and in the claims, the term "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the summary above and the description below, all transitional phrases such as "comprising," "including," "carrying," "having," "containing," "involving," "holding," "composed of," and the like are to be understood to be open-ended, i.e., to mean "including but not limited to". Only the transitional phrases "consisting of" and "consisting essentially of" alone shall be closed or semi-closed transitional phrases, respectively.

For the purpose of this specification, where method steps are described in sequence, the sequence does not necessarily mean that the steps are to be carried out in chronological order in that sequence, unless there is no other logical manner of interpreting the sequence.

In addition, where features or aspects of the invention are described in terms of Markush groups, those skilled in the art will recognise that the invention is also thereby described in terms of any individual member or subgroup of members of the Markush group.

DETAILED DESCRIPTION OF THE INVENTION

It should be noted in the following description that like or the same reference numerals in different embodiments denote the same or similar features.

FIG. 1 shows a system 100 adapted for dispensing individual servings of a beverage, such as for example a beverage vending machine. System 100 comprises a beverage receptacle holder 110 adapted for retaining a beverage receptacle or cup 140. System 100 further comprises a dispensing means for measuring an individual serving quantity of one or more selected beverage mixtures and for depositing said individual serving quantity into a beverage receptacle (cup) held in the beverage receptacle holder 110. The dispensing means comprises a beverage carousel 120 adapted to retain a plurality of cartridges 121, each containing a dry formulation beverage mixture. In a preferred embodiment the number of cartridges can be 10, 11, 12, 13, 14 or 15. The dispensing means further comprises a dry mixing chamber 130 for mixing a plurality of selected beverage formulations from cartridges 121. In accordance with typical beverages likely to be consumed at a particular location or facility where system 100 is positioned, for example at a fitness facility location, the beverage formulations available for selection may include: a pre-workout beverage formulation; a post-workout beverage formulation; a flavouring, or powdered milk product. Such formulations can include but are not limited to protein powders, isowhey powders, branched chain amino acids, carbohydrate free protein powders, meal replacement mixes, skim milk powders, vitamin and mineral powders, flavours. In particular arrangements, a typical beverage available for selection may comprise for example one of either a pre- or post-workout protein formulation; a flavouring selection; and/or a base fluid selection, for example, water, milk (dairy, non-dairy) or the like. In a further arrangement the cartridges can be colour coded, each colour being representative of the contents of the cartridges 121 thereby facilitating the change over of cartridges when they are empty. In one embodiment the beverage cartridges can be replenished in situ or more preferably they are replaceable cartridges.

Each individual cartridge 121 is preferably packed in a moisture free environment direct from a packaging factory to the facility at which system 100 is located. Cartridges are then loaded onto the rotating carousel 120 as required. Each cartridge 121 has its own separate content and air tight in order to keep the moisture out and ensure there is no clogging within the mixing process. The cartridges 121 are fitted with an attachment which is set (according to the supplement) to release the right amount of powdered beverage formulation.

The dispensing means further comprises a dry mixing chamber 130 comprising a mixing agitator 131 disposed therein for agitating and thus mixing the selected dry mix beverage formulations within the dry mixing chamber 130 to provide an individual serving quantity of the selected beverage formulations. The dispensing means is advantageously thermally controlled such that the selected dry mix beverage formulations are prevented from adhering to the surface of the dry mix chamber 130 and/or the agitator 131 thus minimising cleaning requirements for the system 100 and maximising usable up-time between service intervals. The mixing agitator 131 may be a propeller connected to a shaft (not shown). Mixing agitator 131 may advantageously be formed of a copper material and may be actively held at a controlled temperature conducive to prevent the beverage powders from sticking or accumulating on the agitator 131, Temperature control of agitator 131 ensures that, the beverage powders that get dispersed into the mixing chamber 130 are kept at the right temperature, to keep them from sticking to the agitator 131, thus to prevent clogging and the need to have to frequently maintain the system 100 to keep it clean. Once the desired beverage type is selected, possibly comprising a plurality of beverage powders from a plurality of cartridges 121, and all the selected ingredients are dispersed into the mixing chamber 130, whereupon the agitator 131 will spin at high speed, mixing the selected powders together and scattering it into the cup 140.

System 100 further comprises a selection means 180 electrically connected thereto to allow a user to selecting one or more of the available beverage mixtures for the desired beverage. The selection means 180 may comprise a user interface, for example a touchscreen interface or the like, adapted to display to the user the beverages available from the vending machine system 100. The selection means 180 may alternatively comprise a plurality of user-operable controls, such as, for example, selection buttons adapted for selection of a particular one of the beverage selections available from the system as would be appreciated by the skilled addressee. The user interface may also comprise payment options, such as but not limited to accepting a pre-paid debit card having information encoded thereon for both payment options and beverage preferences. The pre-paid debit card may be issued by the establishment hosting the system 100 (vending machine). Other payment options can include pay wave facilities using a user's own debit or credit card facilities. A further option may comprises using a software application (app) that has been downloaded on a user's smart device, the app can function as a payment app and or a beverage selection app.

Vending machine system 100 further comprises a fluid dispensing module 150 for depositing an individual serving quantity of a selected fluid into the cup. The fluid dispensing module 150 may comprise a single fluid reservoir 151 to store a fluid such as, for example, water, preferably purified water. In alternate embodiments (not shown) the fluid dispensing module may comprise a plurality of fluid reservoirs configured to store a selection of fluids, for example water, milk (dairy), milk (non-dairy) etc.

Vending machine system 100 further comprises sealing apparatus 160 for sealing said beverage receptacle after the selected dry mix formulation and fluid have been deposited into the cup 140 and prior to mixing of the beverage constituents for service to the user. Sealing apparatus 160 comprises an extendable shaft 161 adapted to lower a sealing cap 162 to meet the cup 140 whereby sealing cap 162 is lowered onto cup 140 to provide a fluid seal thereto.

Figure 2:
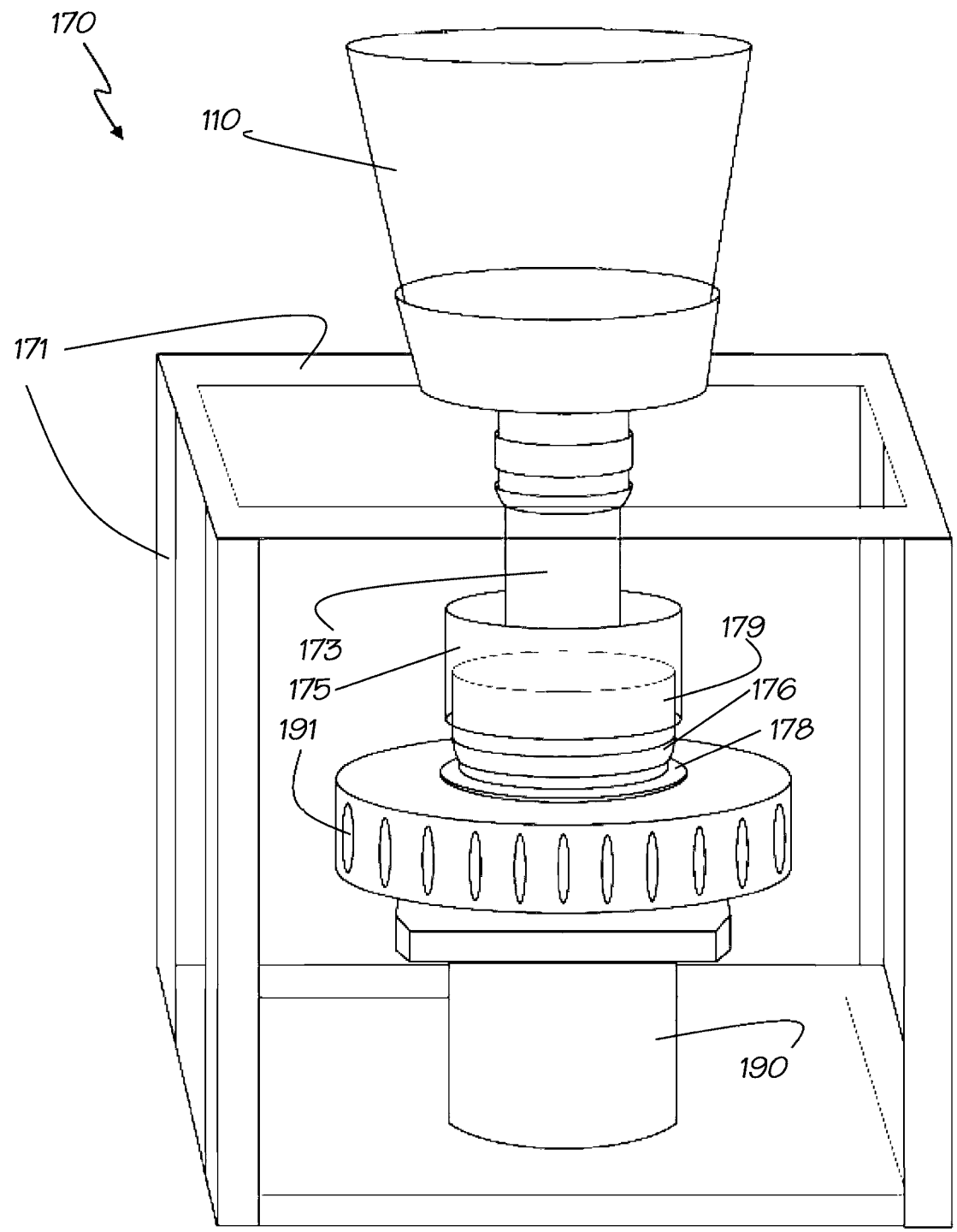
FIG. 2 shows a carrier means adapted to hold a beverage cup and provide a mixing action to ingredients within the cup in accordance with the present invention as disclosed herein.

Referring to FIG. 2, vending machine system 100 further comprises carrier means 170. Carrier means 170 is adapted to retain beverage receptacle holder 110 and to move the beverage receptacle holder 110 when in use retaining a cup 140 between the various functional elements of the vending machine system 100 including the dry mix chamber 130 associated with beverage carousel 120, fluid reservoir 151 associated with dispensing means 150, and sealing apparatus 160. Carrier means 170 comprises a vacuum pump 190 adapted to form a vacuum pressure within beverage receptacle holder 110 thus to retain cup 140 there-within. Vacuum pump 190 comprises air outlets 191 to permit vacuum pressure to be effected within beverage receptacle holder 110.

Carrier means 170 is adapted to holds the vacuum pump in place and steers it, left to right, up and down. The walls 171 of comprise slider rails to facilitate the movement of the carrier means within vending machine system 100.

Carrier means 170 comprises a central primary shaft 173 adapted to retain beverage receptacle holder 110 at the distal end thereof. Carrier means 170 further comprises a secondary shaft 175, wherein the secondary shaft is fixedly attached to rotating gear mechanism (not shown) which includes a rotor portion, clutch armature and gears, and wherein the rotating gear mechanism is adapted to spin secondary shaft 175 at a desired rotation speed. Secondary shaft 175 is further attached to an electromagnetic coupler 176 adapted to selectively couple secondary shaft 175 to primary shaft 173. Carrier means further comprises at least one electromagnet 176 and bearing 178. When rotation of the primary shaft 173 is required to mix the beverage ingredients in cup 140, current flows through electromagnet 176, which produces a magnetic field. The rotor portion of the clutch becomes magnetized and sets up a magnetic loop that attracts the armature. The armature is pulled against the rotor and a frictional force is generated at contact. Within a relatively short time, the load is accelerated to match the speed of the rotor, thereby engaging the armature and the output hub of the clutch. In most instances, the rotor and secondary shaft 175 are constantly rotating all the time.

Figure 3:
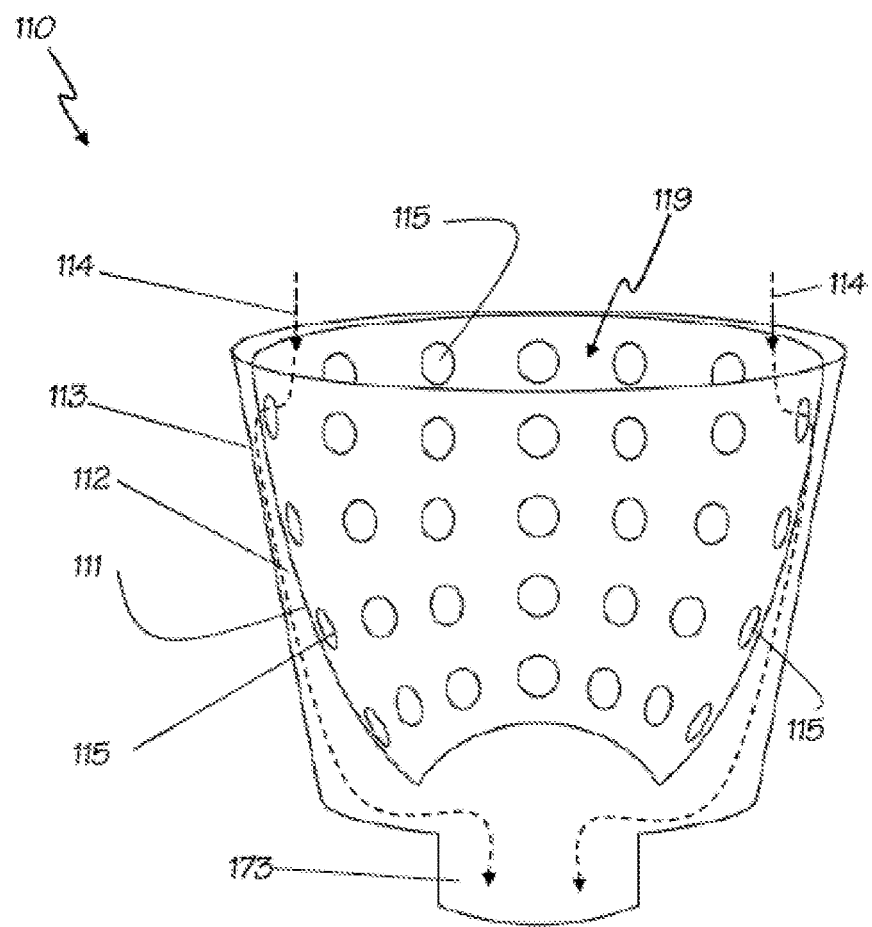
FIG. 3 shows a beverage receptacle holder adapted to retain a cup therein under vacuum pressure in accordance with the present invention as disclosed herein.

Referring to FIG. 3 there is shown beverage receptacle holder 110. Beverage receptacle holder 110 comprises an inner wall 111 spaced from an outer wall 113 forming a recess 119 adapted to receive a beverage container (cup) 140. Inner wall 111 comprises a plurality of apertures 115 adapted for airflow 114 through inner wall 111 into the space 112 between inner wall 111 and outer wall 113 and down primary shaft 173 to the vacuum pump 190.

Beverage receptacle holder 110 is fluidly connected to vacuum air pump adapted to draw air through apertures 115 in the inner wall 111. In use, the vacuum pump is adapted to retain cup 140 (not shown in FIG. 3) within recess 119 under vacuum pressure due to operation of the vacuum pump.

In particular arrangements, the vacuum pump 190 is a direct suction motor as would be appreciated by the skilled addressee. It is supported by an outer casing to keep the motor in place within carrier means 170. The outer casing of the vacuum pump is preferably well ventilated in order to prevent, the vacuum motor from overheating. Secondary shaft 175 of carrier means 170 is preferably fixed to the vacuum pump 190, wherein secondary shaft 175 is hollow to permit airflow therethrough. Primary shaft 173 is also hollow thereby to allow the vacuum to retain a cup 140 in beverage receptacle holder 110 under vacuum pressure and to simultaneously permit the primary shaft 173 to spin at a desired rotation speed for mixing the dry and fluid ingredients of the beverage when deposited into cup 140 held within beverage receptacle holder 110.

Figure 4:
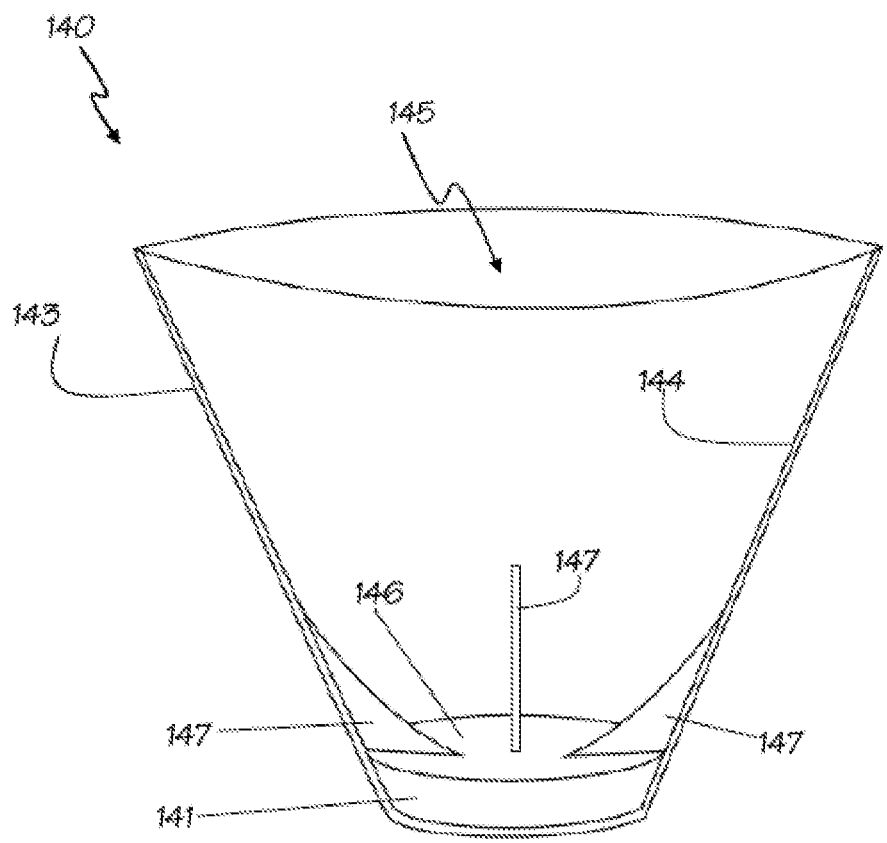
FIG. 4 shows a beverage receptacle holder in accordance with the present invention as disclosed herein.

Referring to FIG. 4 there is shown beverage receptacle (cup) 140 adapted for automated mixing of a serving quantity of a dry formulation beverage mixture with a serving quantity of a fluid. Cup 140 is specifically designed for use in conjunction with vending machine system 100 adapted for on demand dispensing of beverages from a dry mix formulation and is designed to mimic the mixing action of a blender to enable the mixing of the dry formulation and fluid within the cup itself. Cup 140 comprises a base 141, a substantially cylindrical body 143 defining an inner space 145 adapted to retain a fluid beverage therein. Cup 140 further comprises a plurality of mixing formations 147 disposed within the cylindrical body 143 and fixedly attached to an inner wall 144 of body 143 and to the inner surface 146 of base 141 such that, upon deposition of a serving quantity of a dry formulated beverage mixture and a serving quantity of a fluid within body 143 and rotation of the cup 140 receptacle about a central, vertically disposed axis thereof, the plurality of mixing formations 147 provide a mixing agitation within body 143 thereby to mix the dry formulated beverage mixture with the fluid to obtain a mixed beverage. Mixing formations 147 advantageously comprise fins disposed within body 143 of cup 140. The mixing formations 147 generally comprise projections extending into the inner space 145 from the inner wall 144 of cup 140 and are adapted to provide a mixing agitation to an individual serving quantity of the beverage mixture and a fluid disposed within inner space 145 of the cup 140 to provide a mixed beverage for dispensing to the user. In particular arrangements, cup 140 may comprise 2, 3, 4, 5, 6 or more mixing formations 147. Cup 140 may be formed from a plastic material suitable for maximising the effective sealing provided by sealing cap 162 and preferably is sized to retain approximately between 500 mLs to 800 mLs of a beverage, preferably about 600 mLs of a beverage.

Throughout the entire mixing process, the vacuum pump 190 is sucking air through both primary shaft 173 and secondary shaft 175. In preferred arrangements secondary shaft 175 is fixedly attached to vacuum pump 190 and thus is continuously rotating whilst vacuum pressure is being supplied by the vacuum pump 190. However, once cup 140 is sealed by sealing cap 162 of sealing apparatus 160, the rotating secondary shaft 175 is coupled to central shaft 173 via electromagnetic coupler 176, in turn causing beverage receptacle holder 110 and cup 140 to rotate and provide a mixing agitation to the contents therein via mixing formations 147.

In use, a customer (user) selects a desired beverage formulation provided by system 100 via user interface 180. In particular arrangements, the user may provide payment for the beverage either by the usual means, for example, cash or via a credit or debit card, or alternatively, by a pre-loaded charge card as would be appreciated by the skilled addressee. In particular arrangements, the charge card may also provide a secondary function, for example, as a membership card to a facility such as a fitness gym. Once the user's selection has been made, the vacuum is activated, and carrier means moves to its home location at position A (per FIG. 1). At this position, either the customer places a cup 140 into beverage receptacle holder 110 or alternatively a cup automatically deposited into beverage receptacle holder 110 by usual means. The cup is then moved via carrier means 170 such that it is positioned at position B beneath fluid reservoir 151 to receive a serving quantity of fluid e.g. purified water. Whilst the fluid is being dispensed into the cup, the selected dry mix beverage ingredient required for the customer's beverage selection are deposited from cartridges 121 on carousel 120 into mixing chamber 130 and mixed by agitator 131. Carrier means 170 then moves the cup to position C beneath mixing chamber 130 and the mixed dry ingredients are dispersed into the cup 140. The carrier means then moves back to the home location (position A) and sealing apparatus 160 is preferably lowered such that cup 140 is sealed by sealing cap 162 of sealing apparatus 160. Once the cup 140 has been sealed, an electromagnet coupler 176 couples primary shaft 173 to rotating secondary shaft 175 such that primary shaft 173 (and consequently beverage receptacle holder 110 and cup 140) begins to spin at high revolution rate to mix the fluid and dry ingredient within cup 140. The cup is spun for a predetermined period of time, typically between about 10 to 20 seconds although longer mixing times of between 20 to 30 seconds or 30 to 40 seconds or even up to 60 seconds may be required depending the nature of the ingredients to be mixed thus ensuring all the dry formulation ingredients are thoroughly mixed, without any clogging or lumps. Once the beverage is mixed, the electromagnetic coupler 176 is switched off to decouple primary shaft 173 from rotating secondary shaft 175 and the primary shaft 173 thus comes to a stop. Once the primary shaft 173 has stopped spinning the sealing apparatus 160 is raised back to its rest position and the cup 140 containing the mixed beverage is ready to be retrieved from system 100 by the customer. In particular arrangements, the carrier means may further comprise a secondary electromagnet coupler adapted to be turned on whilst primary electromagnetic coupler 176 is turned off (and vice versa). When turned on, secondary electromagnetic coupler is adapted to hold the primary shaft 173 still when not mixing the contents of cup 140.

In a particular arrangement, the vacuum pump may be modified to incorporate the secondary shaft 175. Vacuum motors typically comprise a central rotating shaft comprising a propeller at a distal end thereof to draw air through the pump. The proximal end of the central rotating shaft is typically terminated with a nut adapted to fixedly attach the central shaft to the vacuum motor housing. In a particular arrangement of the carrier means 170 disclosed herein, the central rotating shaft of the vacuum motor may instead terminate in a fixedly connected shaft such that, when the vacuum pump is in operation with central pump shaft rotating to draw air through the pump, the fixedly attached secondary shaft 175 is also continuously rotating. Primary shaft 173 normally is decoupled from the continuously rotating secondary shaft 175, and may be selectively coupled to rotating primary shaft 173 in order to mix dry and fluid contents deposited into cup 140. Selective coupling between the primary shaft 173 and secondary shaft 175 may be effected in a variety of ways as would be appreciated by the skilled addressee, for example, using one or more electromagnetic couplers as discussed above.

Figure 5:
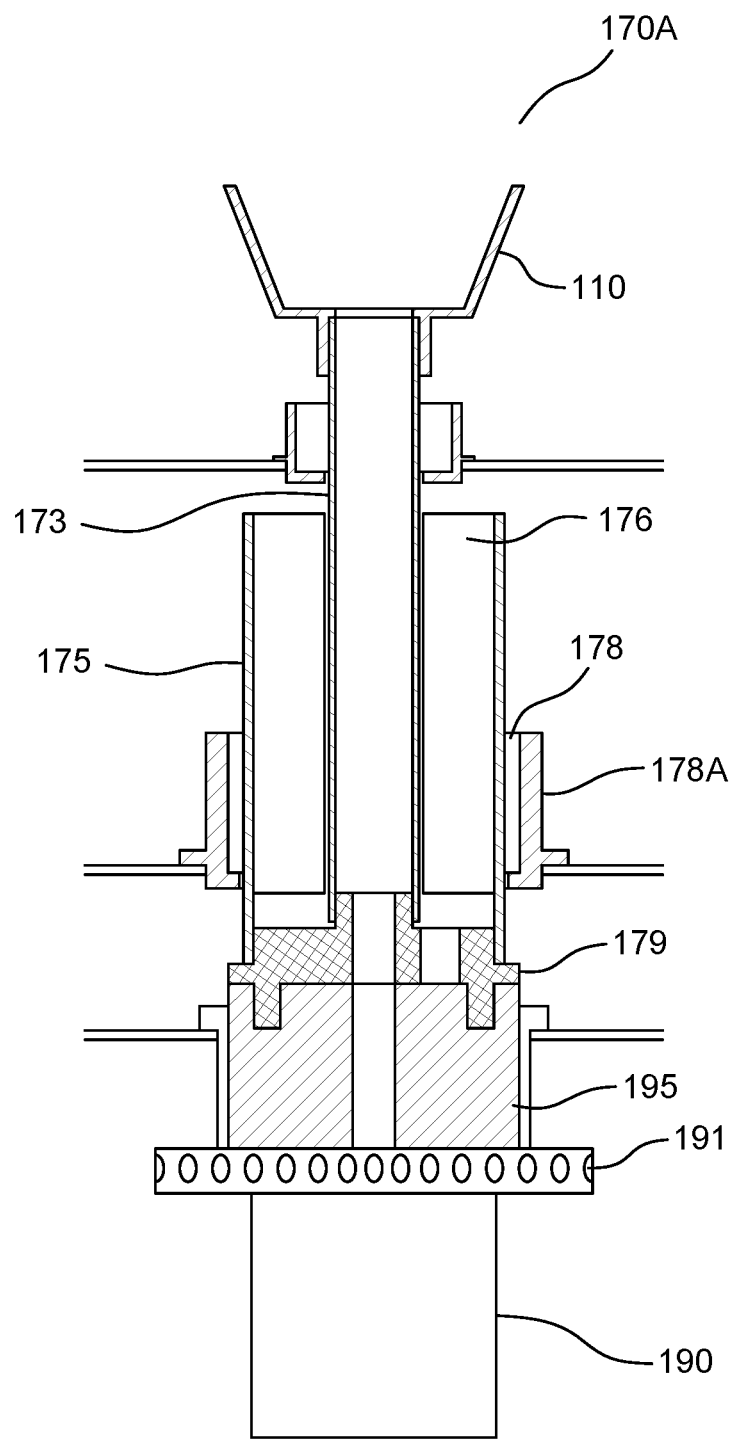
FIG. 5 shows an alternative embodiment of the carrier means (mixing arrangement) of the invention in cross section and as used in the alternative embodiment of the invention of FIGS. 6 to 15.

Turning to FIG. 5 there is shown an alternative embodiment of the carrier means 170, hereinafter 170A, in cross section. Whilst substantially as described in relation to FIG. 2 the alternative embodiment does not include carrier walls 171 or guide rails. Rather the mixing arrangement is secured to a chassis (not shown) of the vending machine is a permanent position.

Further carrier means 170A, hereinafter referred to as the mixing arrangement, is adapted to retain beverage receptacle holder 110 for use in retaining a cup 140 (beverage receptacle). The mixing arrangement 170A comprises a central primary shaft 173 adapted to retain beverage receptacle holder 110 at the distal end thereof and which is also adapted to be connected at its other end to a drive shaft connector 179 which is adapted to engage with the gearbox and motor arrangement 195 that works in conjunction with the vacuum pump 190. The vacuum pump 190 is adapted to form a vacuum pressure within beverage receptacle holder 110 thus to retain cup 140 there-within. Vacuum pump 190 comprises air outlets 191 to permit vacuum pressure to be effected within beverage receptacle holder 110.

The connection of the drive shaft connector 179 to the primary shaft 173 is preferably via a screw attachment, although other attachment means are contemplated and would be known to the skilled addressee. The drive shaft connector 179 is partially hollow as is primary shaft 173 thereby to allow the vacuum to extend to and retain a cup 140 in beverage receptacle holder 110 under vacuum pressure and to simultaneously permit the primary shaft 173 to spin at a desired rotation speed for mixing the dry and fluid ingredients of the beverage when deposited into cup 140 held within beverage receptacle holder 110.

Mixing arrangement 170A further comprises a secondary shaft 175, wherein the secondary shaft is fixedly attached to rotating gear mechanism (not shown) which includes a rotor portion, clutch armature and gears, and wherein the rotating gear mechanism is adapted to spin secondary shaft 175 at a desired rotation speed. Secondary shaft 175 is further attached to an electromagnetic coupler 176 adapted to selectively couple secondary shaft 175 to primary shaft 173. Mixing arrangement 170A further comprises at least one electromagnet 176 and bearing 178 and bearing support 178A. When rotation of the primary shaft 173 is required to mix the beverage ingredients in cup 140, current flows through electromagnet 176, which produces a magnetic field. As described for FIG. 2 the rotor portion of the clutch becomes magnetized and sets up a magnetic loop that attracts the armature. The armature is pulled against the rotor and a frictional force is generated at contact. Within a relatively short time, the load is accelerated to match the speed of the rotor, thereby engaging the armature and the output hub of the clutch.

Figure 5C:
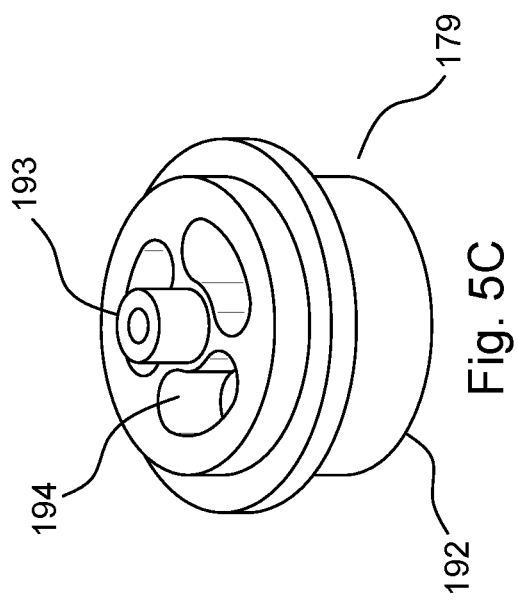
FIGS. 5A to 5C show the drive shaft connector in top view (FIG. 5A) with a cross section taken through line A-A, cross section A-A (FIG. 5B), and perspective view thereof (FIG. 5C)
Figure 5A:
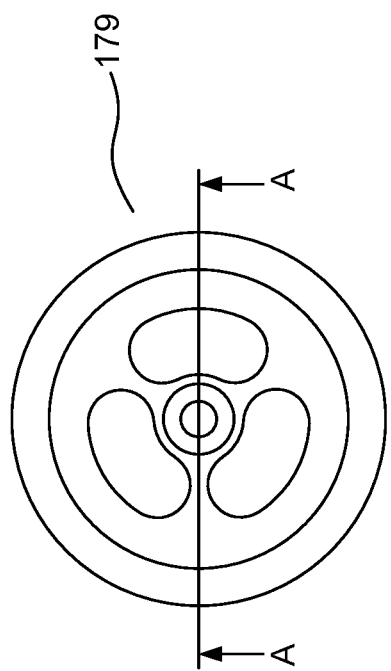
Figure 5B:
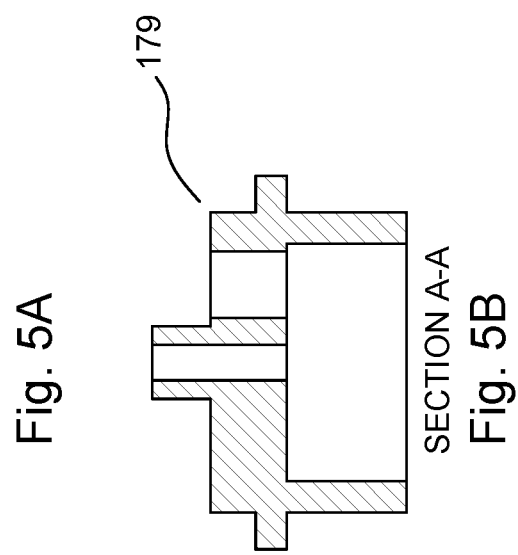

Turning to FIG. 5A there is a top view (A) of drive shaft connector 179 with line A-A being a cross section line. FIG. B shows the cross section of drive shaft connector 179. FIG. 5C shows a perspective view of drive shaft connector 179 comprising rim 192 that is adapted to engage with the combination gearbox motor arrangement 195. FIG. 5C also shows the primary shaft 173 connecting means 193 and hollows 194 that allow the vacuum to be applied through the drive shaft connector, primary shaft 173 such that in use the cup 140 is firmly led in the beverage receptacle holder 140.

Figure 6:
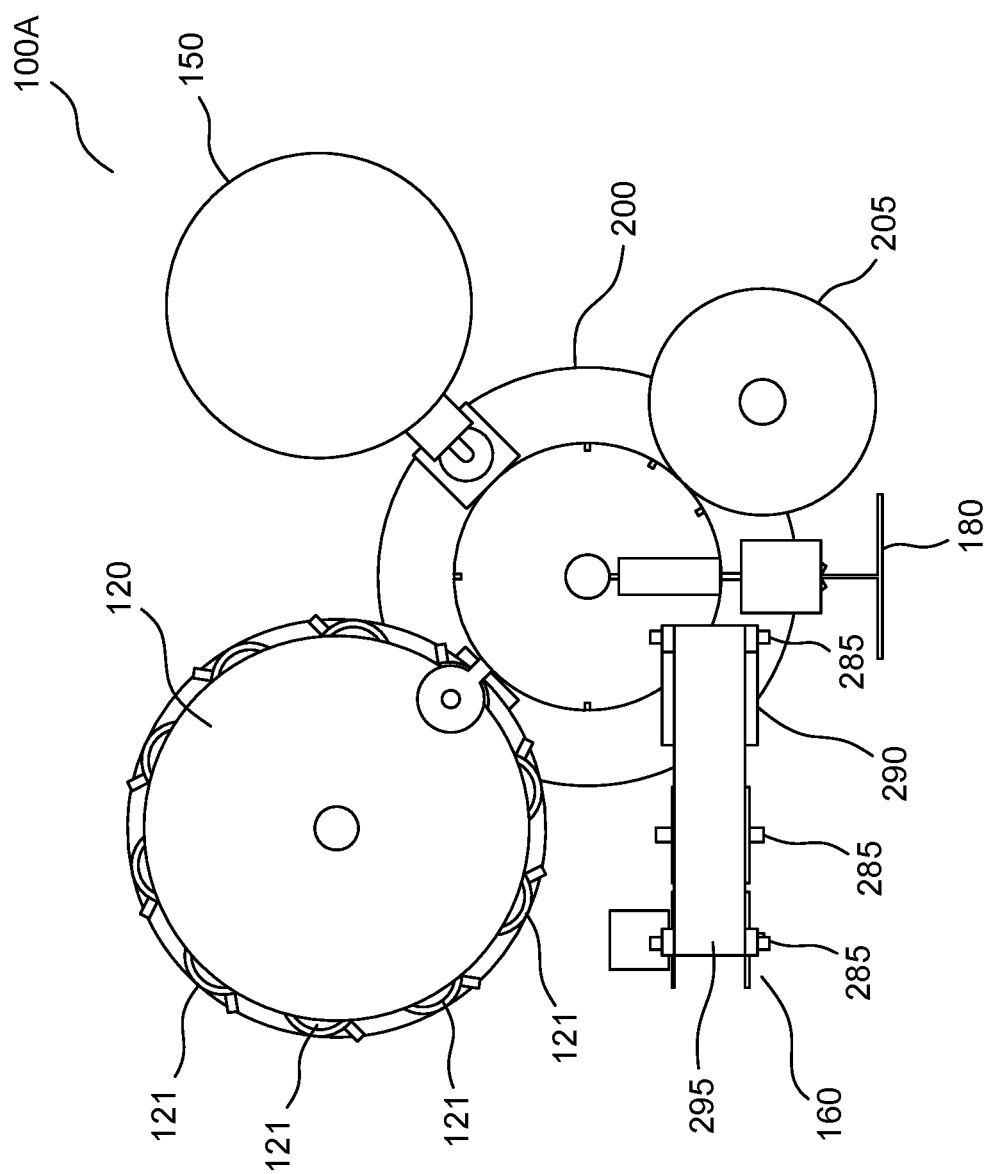
FIG. 6 shows an alternative embodiment of the beverage dispensing system in accordance with the present invention (vending machine) in a top schematic overview.
Figure 7:
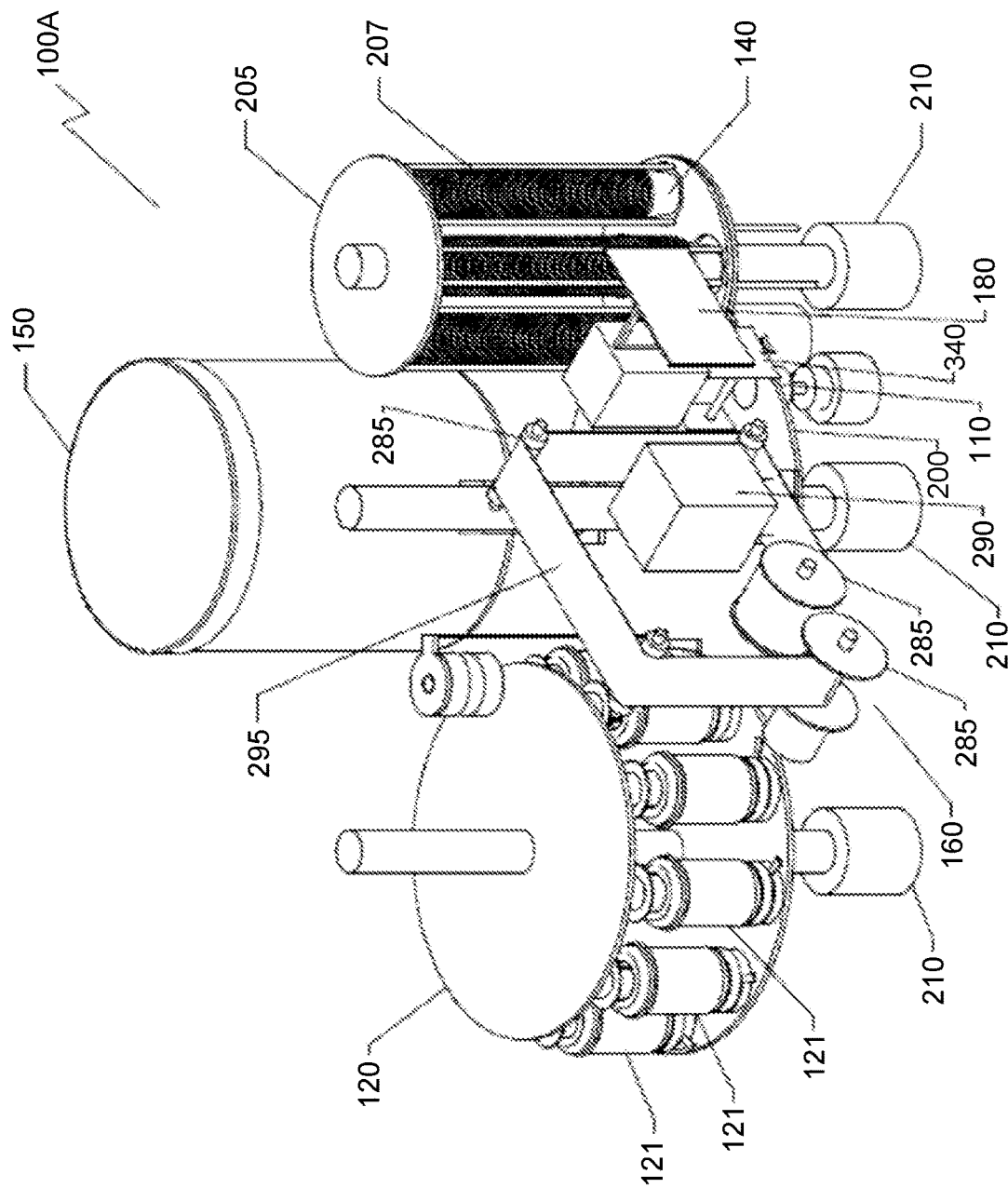
FIG. 7 shows an alternative embodiment of the beverage dispensing system in accordance with the present invention (vending machine) of FIG. 6 in a perspective view.

FIGS. 6 and 7 show an alternative embodiment of the invention of the beverage dispensing system. System 100A, which system is also adapted for dispensing individual servings of a beverage, or a beverage mixture, such as for example a beverage vending machine. System 100A comprises a rotating beverage receptacle carousal 200 adapted to hold at least one beverage receptacle 140 (alternatively termed a cup, not shown in FIG. 6) and which carousal is capable of rotary movement between various stations. The cups 140 are substantially the same as previously described with reference to FIG. 4. These stations include a cup nester arrangement 205 having a plurality of cup holders 207 (see FIG. 7) for holding multiple stacked cups 140 and which itself is capable of rotational movement so that when one cup stack empties another cup stack is rotated into position in order that there is a continuous supply of cups 140 for subsequent delivery to the fluid dispensing module 150 (the second station) for depositing an individual serving quantity of a selected fluid into the cup. In alternate embodiments (not shown) the fluid dispensing module may comprise a plurality of fluid reservoirs configured to store a selection of fluids, for example water, milk (dairy), milk (non-dairy) etc.

The fluid may be for example water, preferably purified water such as filtered water. In alternative embodiments (not shown) the fluid reservoir may include a plurality of fluid reservoirs to store a selection of fluids. A further station (third station) includes a beverage carousal 120 adapted to retain a plurality of cartridges 121 that hold dry formulation beverage ingredients or preferably pre-prepared beverage mixes/formulations. Preferably the number of cartridges is selected from about 10, 11, 12, 13, 14 or 15. As in system 100 the beverage ingredients or mixes/formulations can include pre-work out formulations, post-work out formulations. Such formulations can include but are not limited to protein powders, isowhey powders, branched chain amino acids, carbohydrate free protein powders, meal replacement mixes, skim milk powders, vitamin and mineral powders, flavours. In one embodiment the beverage cartridges can be replenished in situ or more preferably they are replaceable cartridges. Each cartridge 121 has its own separate content and is air tight in order to keep moisture out and ensure easy delivery of its contents with clogging or caking of the ingredients. The beverage cartridges 121 are advantageously designed to deliver a fixed amount of beverage mixture. This can be as a fixed amount (shot) of dry ingredient mixture. Each beverage cartridge 121 can be adapted such that it can deliver multiple shots, or the beverage receptacle carousal 200 can be adapted to travel back or forward between cartridges to deliver multiple shots of the same or different ingredients/mixes. In some embodiments where a fixed shot amount is programmed for each beverage cartridge, the cartridge holder 120 can been configured to include multiple cartridges of frequently used mixtures or ingredients thus permitting multiple shots to be able to be delivered consecutively thus avoiding the need for the carousal 200 to move back and forth between cartridges. Preferably each cartridge delivers the same quantity of mixture or ingredient thus allowing a fixed size cartridge to be used in the system. The mixtures are preferably formulated to be able to provide a fixed shot to be delivered from each cartridge. The shot can be in the range of about 5 to 30 grams, preferably about 20 grams, more preferably 15 grams, even more preferably 10 grams, still even more preferably 5 grams. Other gram amounts are also contemplated for use in the system and as might be required for specialist beverage formulations and as would be appreciated by the skilled addressee. As with system 100 the cartridges 121 can be suitably colour coded for case of installation and removal. Equally the beverage carousal 120 can be adapted such that the cartridge receiving (installation) ports are colour coded thus facilitating a simple but effective means to match the appropriate cartridge with its position on the carousal. These positions can be programmed in to the software used to operate the system 100 or 100A thereby avoiding the potential to dispense incorrect ingredients or mixes. The beverage carousal 120 is preferably of rotary design enabling the beverage canisters to be rotated to the dispensing position dispense their beverage mix or ingredient and then rotate in order to position another beverage canister so it can dispense its contents in the same or a different cup according to the selection made by a user through the selection means 180.

The system 100A further comprises a fourth station that includes a heat sealing apparatus 160 for sealing the cup and after the cup has both the fluid and beverage mixture additions. The heat sealing apparatus includes a plurality of rollers 285 that hold and guide the sealing film 295 (equivalent to the sealing cap 162 of system 100) and a heating/sealing/cutting arrangement 290.

The system 100A further comprises a final station (the fifth station), the mixing station, at which station is located the beverage receptacle holder 110 and which is substantially as described previously with reference to FIG. 3 and which is adapted to hold cup 140. The mixing station is substantially as shown in FIG. 2 but without the carrier means function as provided by the slider rails of walls 171 of carrier means 170. Within system 100A the carrier means function has been replaced using the rotating beverage receptacle carousal 200 that moves the cup 140 between the respective stations in a rotary movement. Also located at the fifth station is the dispensing portal where the user collects their mixed beverage. When in use the system 100A is configured to prevent hand access to the dispensing portal which is provided with a cover plate 340.

System 100A further comprises a selection means 180 which is electrically connected to the system 100A and allows a user to select one or more of the available beverage mixtures for the desired beverage. The selection means 180 may comprise a user interface, for example a touchscreen interface or the like, adapted to display to the user the beverages available from the vending machine system 100. The selection means 180 may alternatively comprise a plurality of user-operable controls, such as for example selection buttons adapted for selection of a particular one of the beverage selections available from the system as would be appreciated by the skilled addressee. The user interface may also comprise payment options, such as but not limited to accepting a pre-paid debit card having information encoded thereon for both payment options and beverage preferences. The pre-paid debit card may be issued by the establishment hosting the system 100 (vending machine). Other payment options can include pay wave facilities using a user's own debit or credit card facilities. A further option may comprise using a software application (app) that has been downloaded on a user's smart device, whereby the app can function as a payment app and/or a beverage selection app.

As shown in FIG. 7 each of the beverage receptacle carousal 200, cup nester arrangement 205 and beverage carousal 120 include a separate motor 210 for operating the respective stations functions. The motors are preferably electric motors, more preferably stepper motors. The functions of each driven station can be controlled using a variety of means know to the skilled addressee such opto-couplers for sensing and controlling mechanical positions (not shown) and micro-processors (not shown) to operate specifically written software for controlling the movements and operations of the respective stations and arrangements.

In use, a customer (user), selects a desired beverage formulation provided by system 100A via user interface 180. Once the user's selection has been processed system 110A is activated and the various steps in dispensing the beverage commence as described herein and with reference to the below Figures.

Figure 8A:
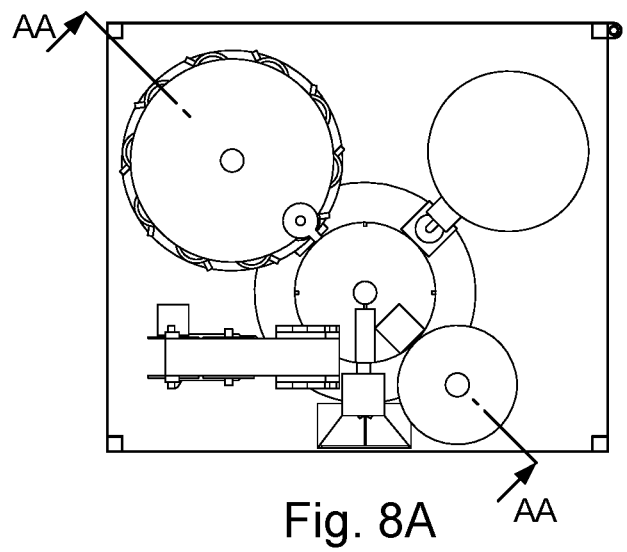
FIGS. 8A, 8B, 8C, 8D and 8E show respectively a top schematic overview (FIG. 8A) of the alternative embodiment of the present invention and where line AA-AA is a cross section line, the cross section being illustrated in FIG. 8B.
Figure 8B:
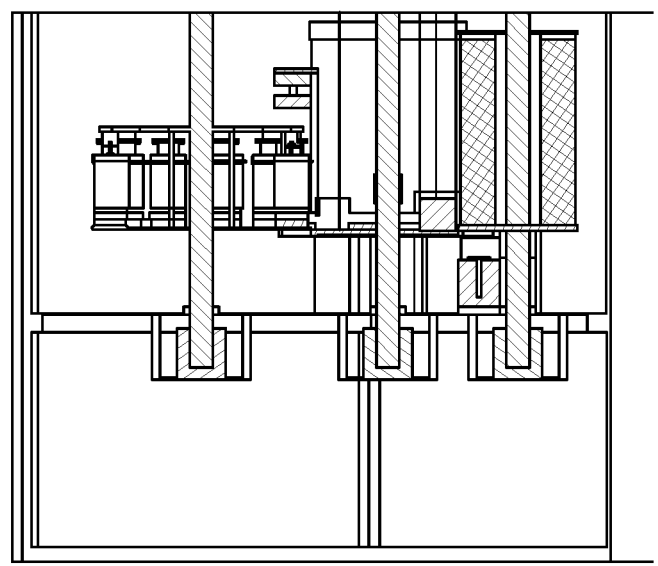

Turning to FIGS. 8A to 8E, FIG. 8A shows a top view of a schematic of the system 100A including a cross sectional line AA-AA taken through the beverage receptacle carousal 200, cup nester arrangement 205, and beverage container carousal 120. FIG. 8B shows the cross section and highlighted in section Z showing the cup nester arrangement 205 and which is shown in detail in FIG. 8C.

Figure 8C:
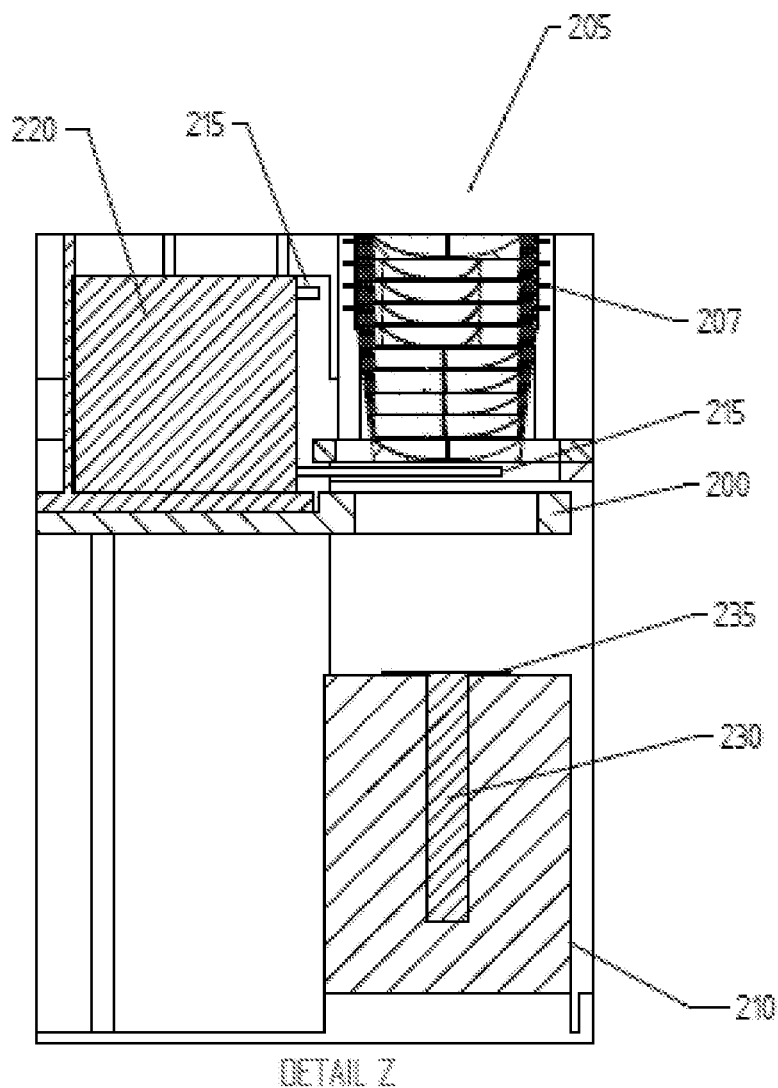
Figure 8D:
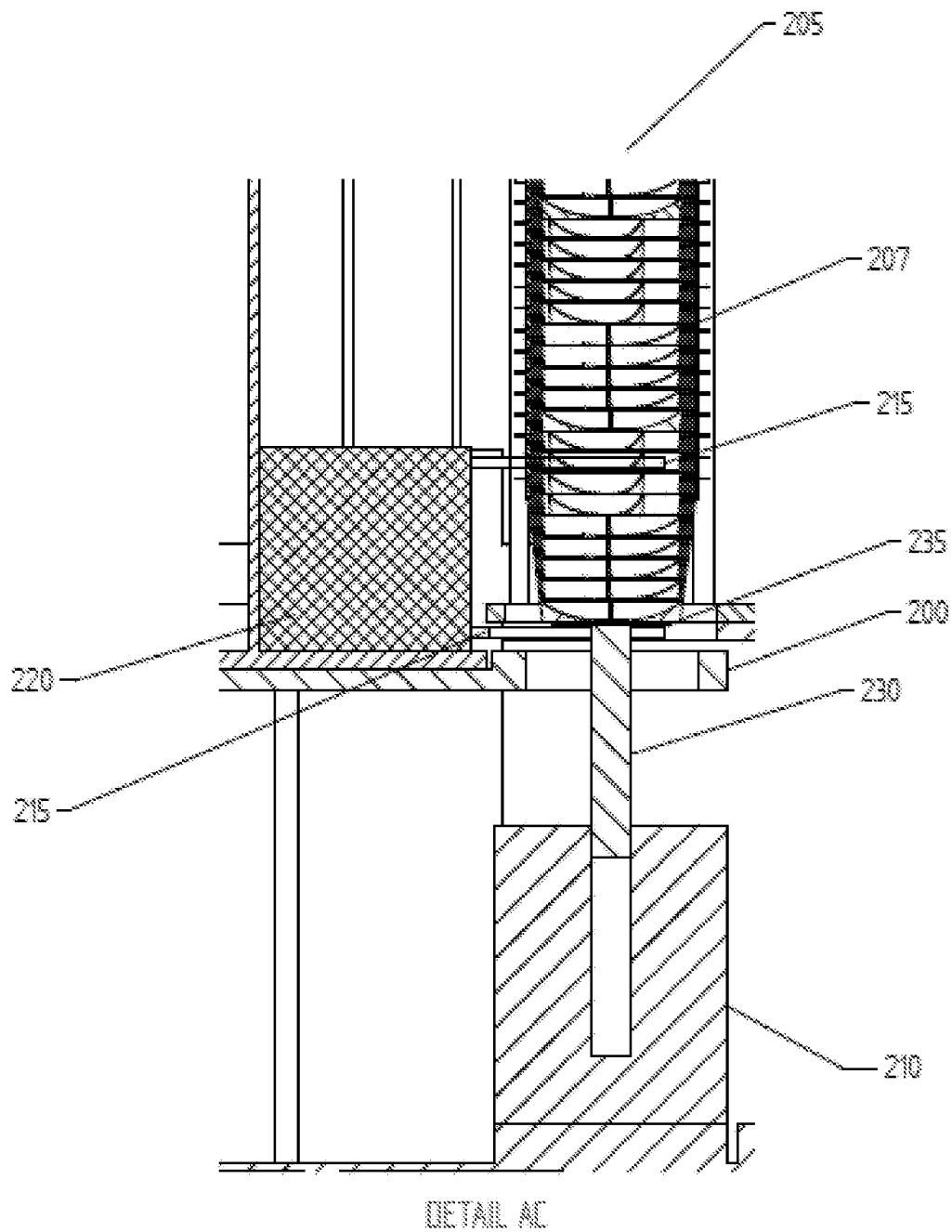
Figure 8E:
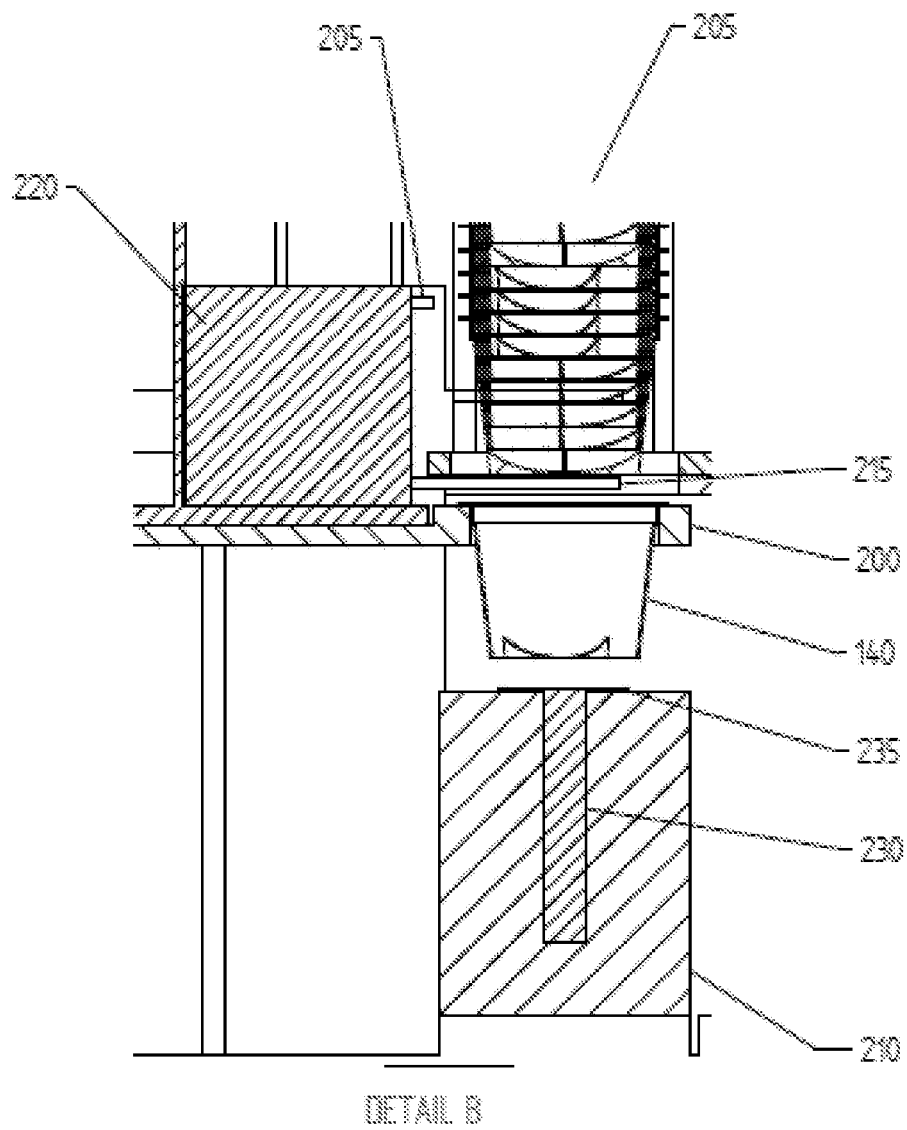

With respect to FIG. 8C there is shown a cup nester arrangement 205 which includes a plurality of cup holders 207 (only one shown) wherein the cup holder, each of which can hold a plurality of cups 140, is positioned to deliver a cup to the beverage receptacle carousal 200. Each cup holder 207 has a top and bottom portion and where at the bottom portion adjacent to the upper surface of the beverage receptacle carousal there is located at least one cup separation pin 215 that prevents the cups from falling out of the cup holder 207. To deliver the cup 140 into the beverage receptacle carousal suction pin 230, having a suction contact portion 235 at its upper distal portion, is extended upwardly from, and being driven by electric motor 210 to engage with the base of the bottom most cup 140 in the cup holder 207. The cup separation pin is retracted by electric motor 220 and the suction pin 230 and contact portion 235 with the cup 140 attached is then drawn downward and the cup 140 is captured by the beverage receptacle carousal 200. The cup separation pin 215 then returns to its original position to hold the next cup in place for the order as shown in FIG. 8E. The captured cup is detected by a sensor (not shown) and travels to the next station, the fluid dispensing module (second station).

Figure 9A:
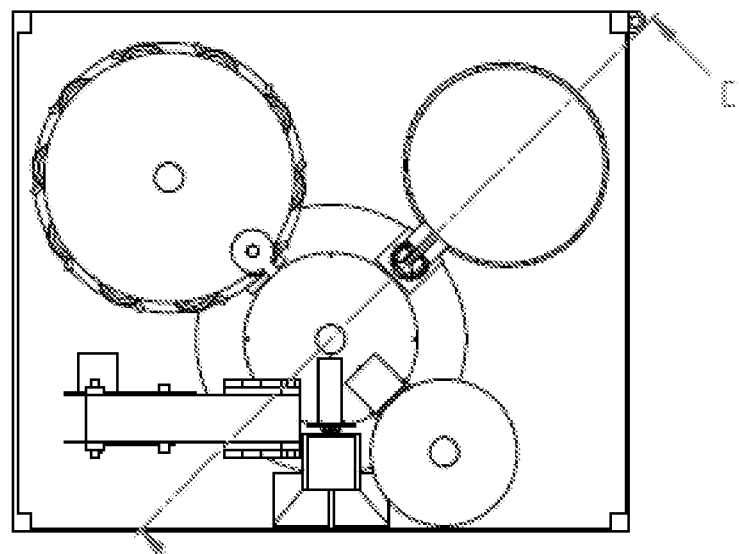
FIGS. 9A, 9B and 9C show respectively a top schematic overview (FIG. 9A) of the alternative embodiment of the invention and where line C-C is a cross section line, the cross section being illustrated in FIG. 9B.
Figure 9B:
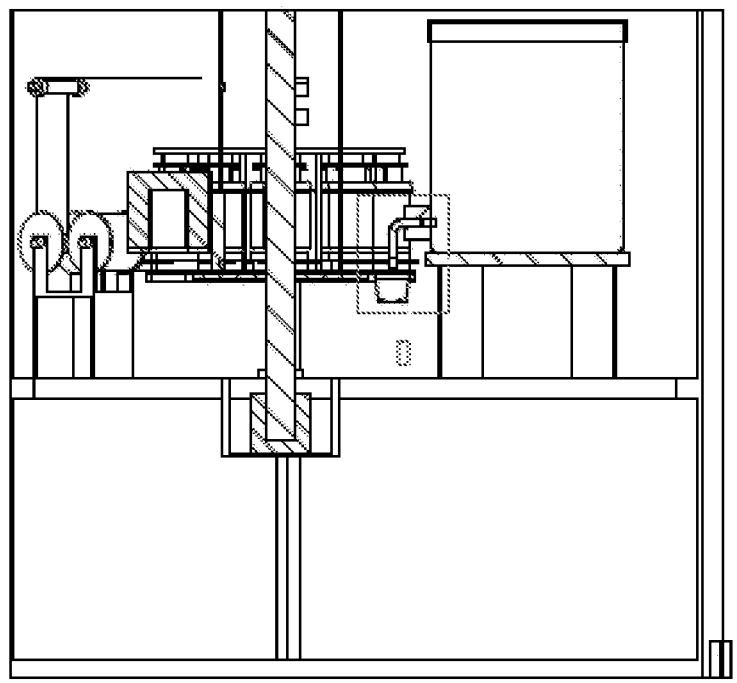
Figure 9C:
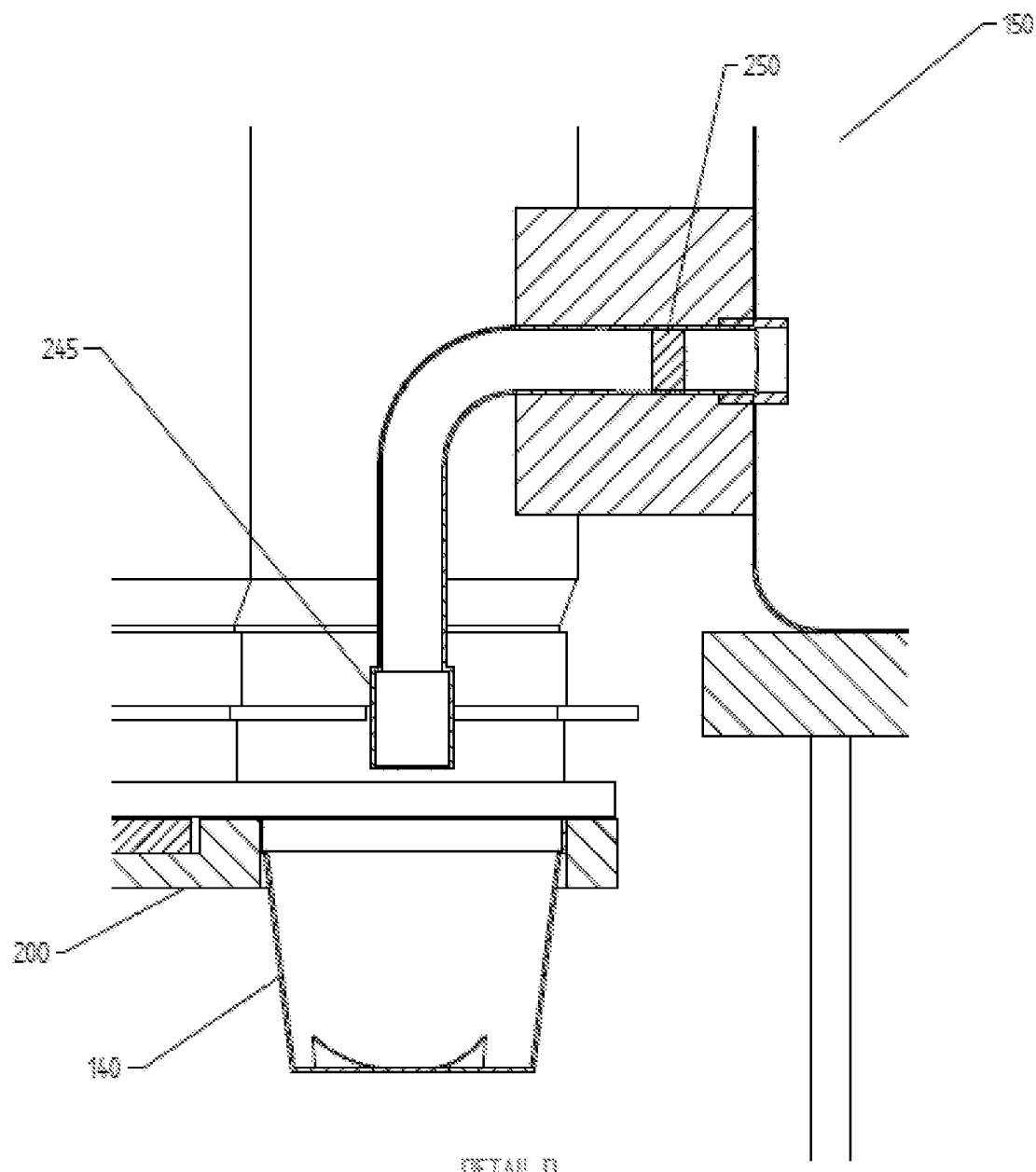

Turning to FIGS. 9A to 9C there is shown a top view of a schematic of system 100A including a cross sectional line C-C taken through the heat sealing apparatus 160, beverage receptacle carousal 200 and fluid reservoir 150. FIG. 9B shows a portion of the cross section highlighted as section D and wherein the cup 140 has travelled from station one (the cup nesting arrangement) to station two, the fluid dispensing module 150. Cup 140 is held in the beverage receptacle carousal 20 and is now positioned at fluid dispensing module 150 and in particular below the fluid delivery nozzle 245. The delivery of fluid is controlled by valve 250 and which is activated when the cup 140 arrives at the station and sensed to have arrived at the station. A sensor device, such as an opto-electrical sensor (not shown) detects the arrival and positioning of the cup 140, halts the travel of the beverage receptacle carousal 200, and relays a signal to a solenoid (not shown) to open the valve 250. The delivery of the required amount of fluid is monitored by suitable means such as a timer (not shown) or preferably by sensors such as opto-electric sensors (not shown) such that the when the required volume of fluid has been delivered to the cup the solenoid closes the valve 250. The skilled addressee will appreciate the types of sensor devices and solenoids that can be adapted for use in the invention. The volume of dispensed fluid can vary according to the beverage requirements and as may be determined through the user interface 180 as previously described.

Figure 10A:
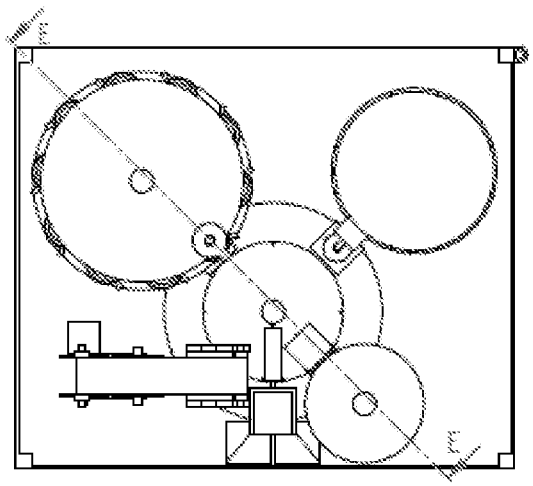
FIGS. 10A, 10B and 10C show respectively a top schematic overview (FIG. 10A) of the alternative embodiment of the invention and where line E-E is a cross section line, the cross section being illustrated in FIG. 10B.
Figure 10B:
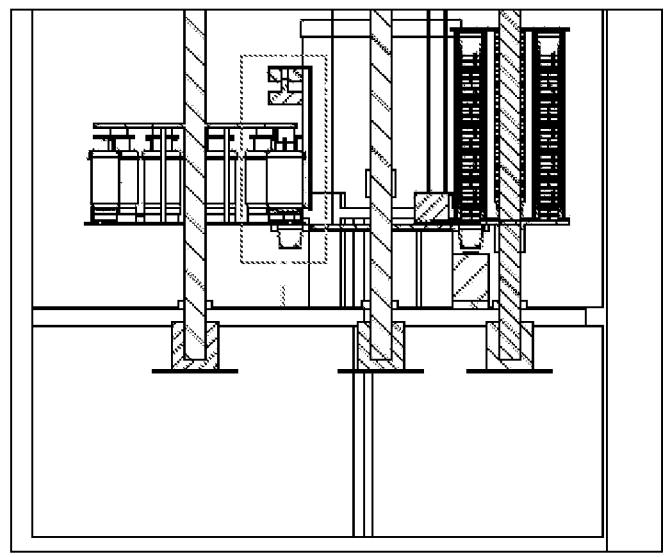
Figure 10C:
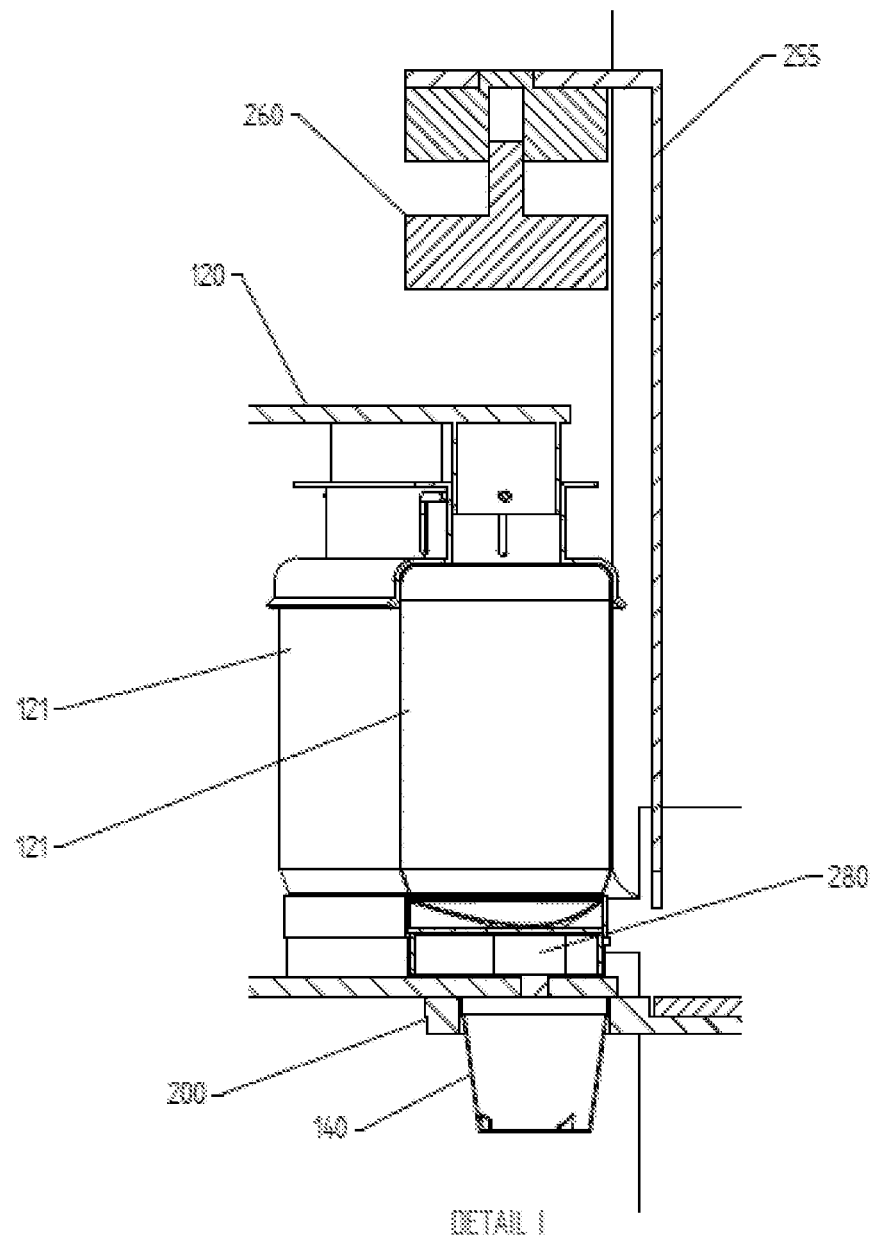

Turning to FIGS. 10A to 10C there is shown a top view of a schematic of system 100A including a cross section line E-E taken through the beverage carousal 120, beverage receptacle carousal 200 and cup nesting arrangement 205. FIG. 10B shows a portion of the cross section highlighted as section I, which is enlarged in FIG. 10C. As shown in FIG. 10C cup 140 located in beverage receptacle carousal 200 has travelled from station two to station three, the beverage mixture dispensing station, and is positioned under dispensing port 280 of cartridge 121. A sensor device, such as an opto-electrical sensor (not shown) detects the arrival and positioning of the cup 140 and halts the travel of the beverage receptacle carousal 200. The cartridges 121 are mounted on a rotary plate arrangement that moves over the cup for dispensing the beverage ingredients based on the selection made by the user through the user interface 180. Dispensing port 280 is adapted to receive a defined amount of beverage ingredient or mix from the main body of the cartridge 121 in response to instructions received through the user interface 180 and ancilliary software. The beverage carousal 120 also includes an upper plate for holding the beverage cartridges 121 in place in cooperation with a bottom rotary plate arrangement that is adapted to receive the cartridges (details not shown). The upper plate is shown in the top schematic as part 120 and which is adapted to support a further motor 260 to which is attached a lever arm 255 which can be raised and lowered by the motor 260.

Figure 11A:
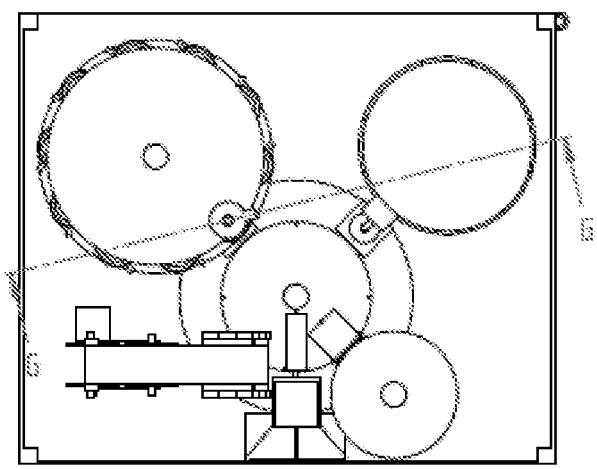
Figure 11B:
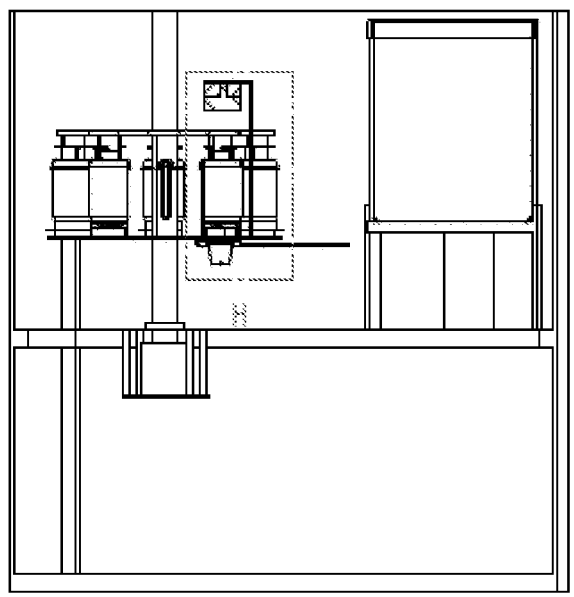
Figure 11C:
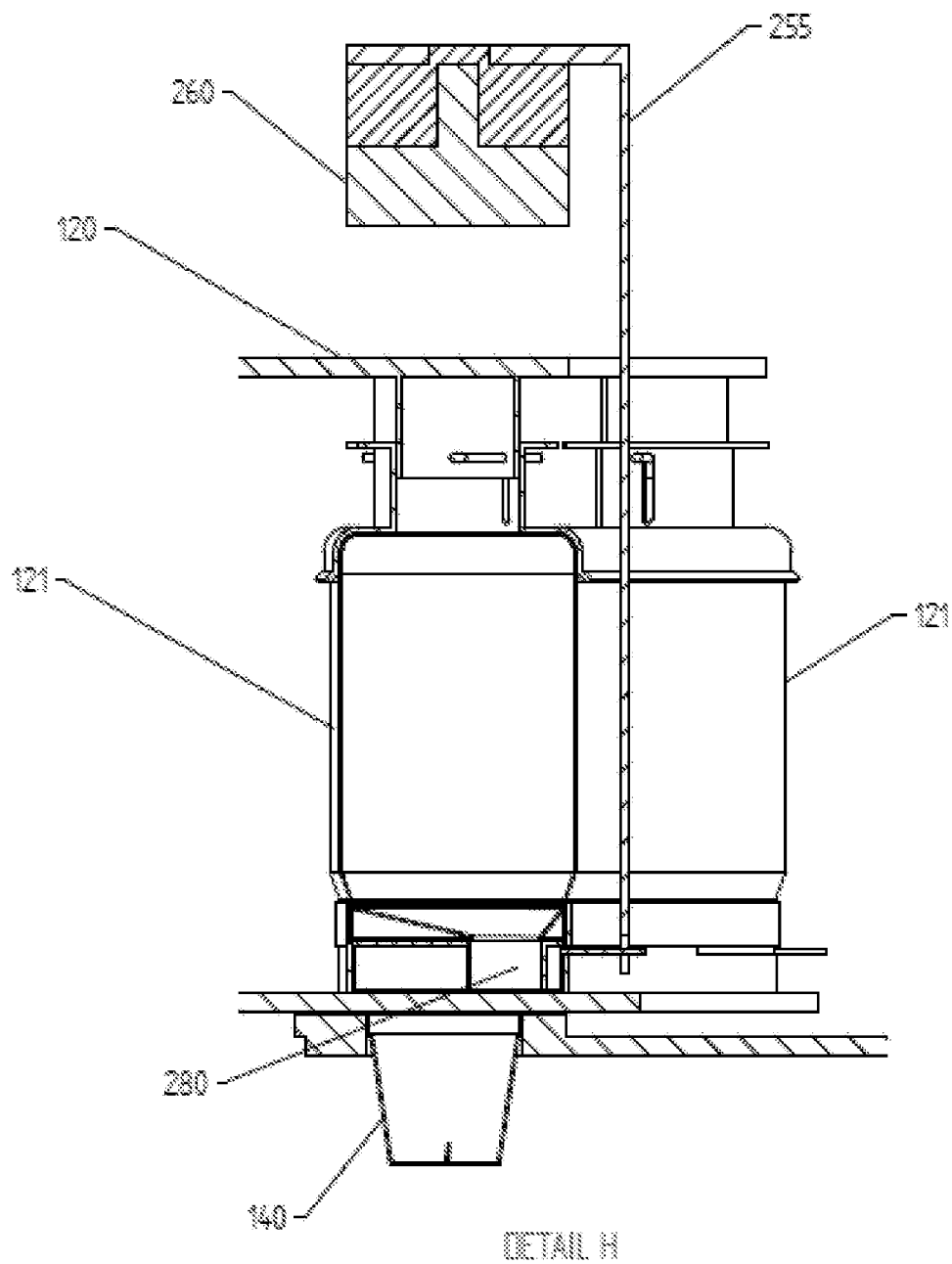

FIGS. 11A to 11C show the next phase in the displacement of the beverage mix to cup 140. FIG. 11A shows a top schematic of system 100A and a cross section line G-G through the beverage carousal 120, beverage receptacle carousal 200 and cup nesting arrangement 205. FIG. 11B shows cross through line G-G and in particular highlighted section which is expanded in FIG. 11C.

Shown in FIG. 11C is the placement of the cup 140, and supported in the beverage receptacle carousal 200, under the beverage cartridge and dispensing port 280. Preferably dispensing port 280 is adapted to receive a fixed amount of the beverage ingredient or mix. FIG. 11C further shows lever arm 255 now in a lowered position such that it engages with canister lever arm 270 (see FIG. 12C) which extends outwardly from the lower end of the beverage cartridge. The lowering of the lever arm 255 is facilitated by electric motor 260. Various engagement means between the lever arm 255 and canister lever arm 270 are contemplated and would be known to persons skilled in the art but could include a simple spatial placement on one or other side of the canister lever arm 270 and whereby the rotational movement of the lever arm 255 by motor 260 causes the canister lever arm to be moved in a predetermined direction. Other means could include a recess or slot (not shown) in canister lever arm 270 into which the downwardly directed lever arm 255 engages and the rotational direction of the motor 260 facilitates the directional movement of the canister lever arm 270.

Figure 12A:
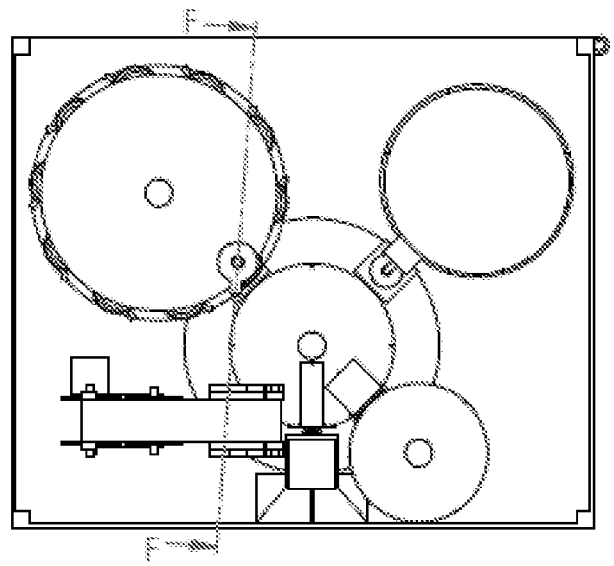
Figure 12B:
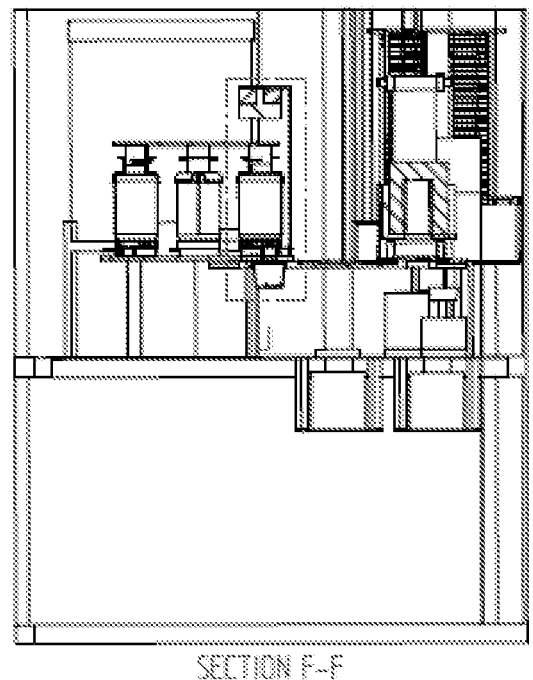

Turning to FIGS. 12A to 12C there is shown in FIG. 12A a top schematic of system 100A and through which is drawn a cross section line F-F. The line F-F passes through the beverage carousal 120 and a beverage cartridge 121, including motor 260 and lever arm 255 and through the heating sealing apparatus. FIG. 12B shows the cross section of line F-F and a highlighted section J. FIG. 12C is an expanded view of section J and shows dispensing port 280 open thus disgorging the pre-determined amount of beverage ingredient or mix into cup 140. The dispensing port 280 is opened by the rotational movement of canister lever arm 270 by lever arm 255 and through a rotational movement thereof by motor 260.

Figure 13A:
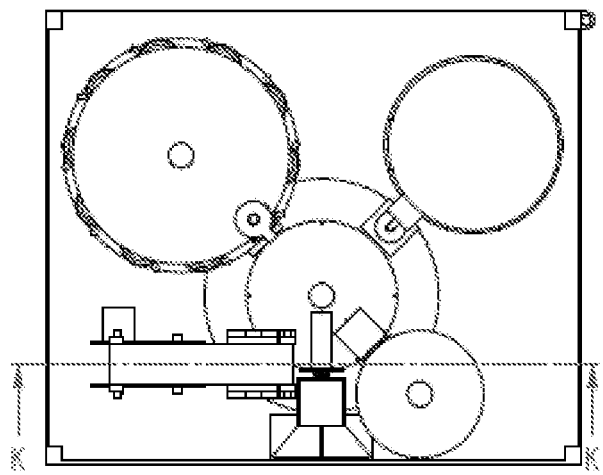
FIGS. 13A, 13B, and 13C show respectively a top schematic overview (FIG. 13A) of the alternative embodiment of the invention and where line K-K is a cross section line, the cross section being illustrated in FIG. 13B.
Figure 13B:
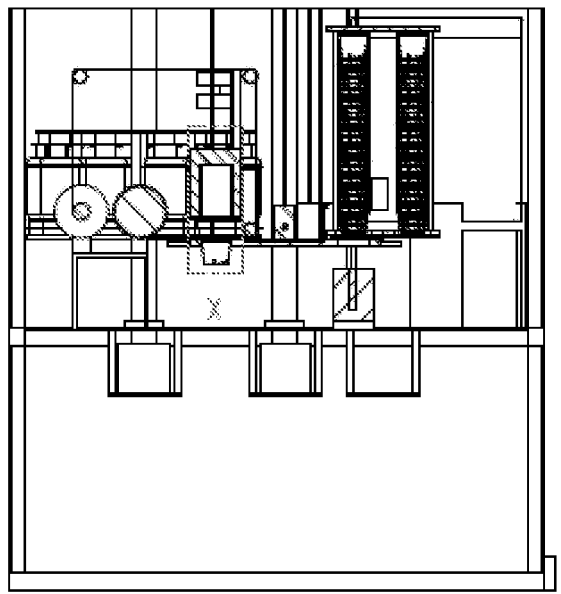
Figure 13C:
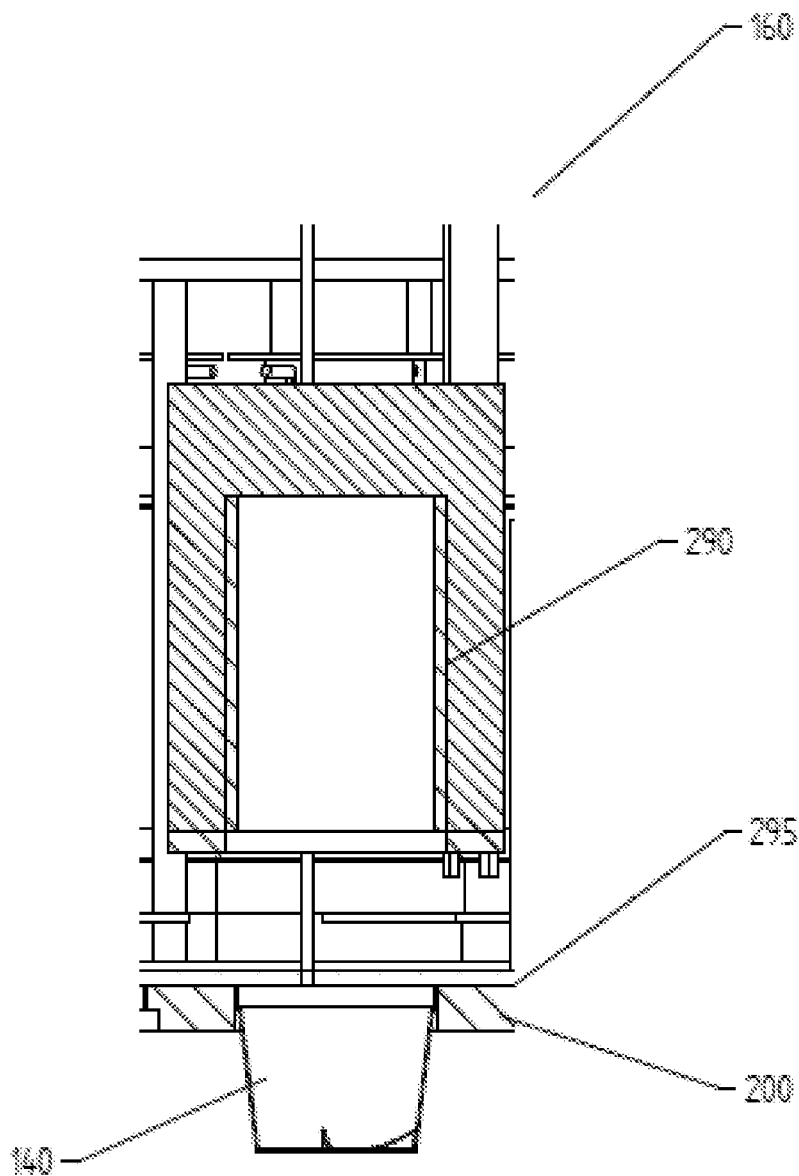

Turning to FIGS. 13A to 13C there is shown in FIG. 13A a top schematic view of system 100A with a cross section line K-K that passes through the combination heat sealing apparatus 160 and cup nester arrangement 205. FIG. 13B shows the cross section of line K-K and highlighted section X. FIG. 12C is an expanded view of section X showing the position of cup 140 at station four, the heat sealing station. Cup 140, now containing the beverage components including both the fluid and beverage powder mixes, is moved to and held in place under the heat sealing and cutting arrangement 290 of the heat sealing apparatus 160. Heat sealing film 295 is maintained on a roller structure and guided via roller guides 285 (as shown in FIG. 6 and FIG. 7). As with the other stages the rotational movement of the beverage receptacle carousal and the positioning of the cup at the required position is monitored and actuated using appropriate sensor technology as already discussed above, such as opto-electric sensors (not shown). In FIG. 13C the heat sealing and cutting arrangement 290 comprises both a heating arrangement (not shown) to seal the sealing film 295 to the distal edge rim) of cup 140 and a cutting arrangement (not shown, but which is located at the lower distal edge of the heating sealing and cutting arrangement 290) to cut the sealing film. FIG. 13C shows the heat sealing and cutting arrangement 290 retracted in to its housing in the pre-sealing cutting position.

Figure 14A:
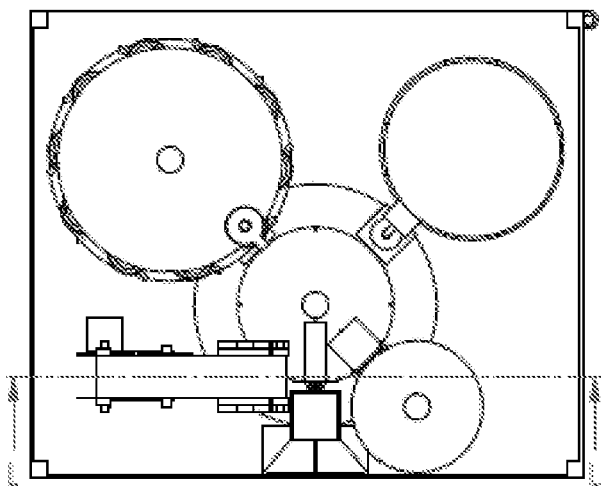
FIGS. 14A, 14B and 14C show respectively a top schematic overview (FIG. 14A) of the alternative embodiment of the invention and where line L-L is a cross section line, the cross section being illustrated in FIG. 14B.
Figure 14B:
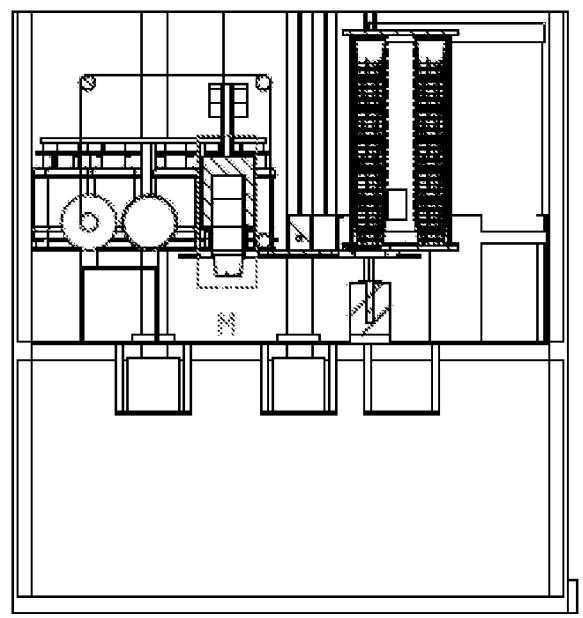
Figure 14C:
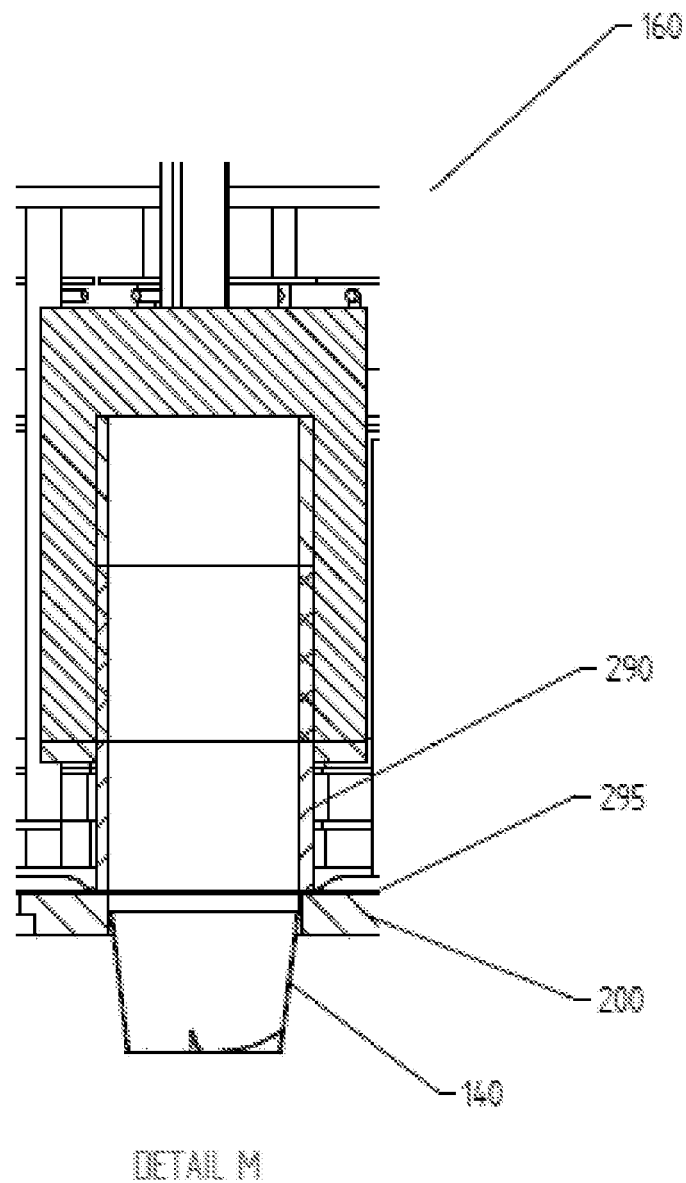

Turning to FIGS. 14A to 14C, FIG. 14A shows a top schematic view of the system 100A and cross section line L-L. FIG. 14A shows cross section L-L which is the same as cross section K-K of FIG. 13A. FIG. 14B similarly shows the same cross section as FIG. 13B and a highlighted section M. Section M shows the downward displacement of the heating sealing and cutting arrangement 290 from its housing and thereby heating sealing film 295 and cutting same around the upper edge (rim) of cup 140 thus forming a sealed beverage cup with contents.

Figure 15A:
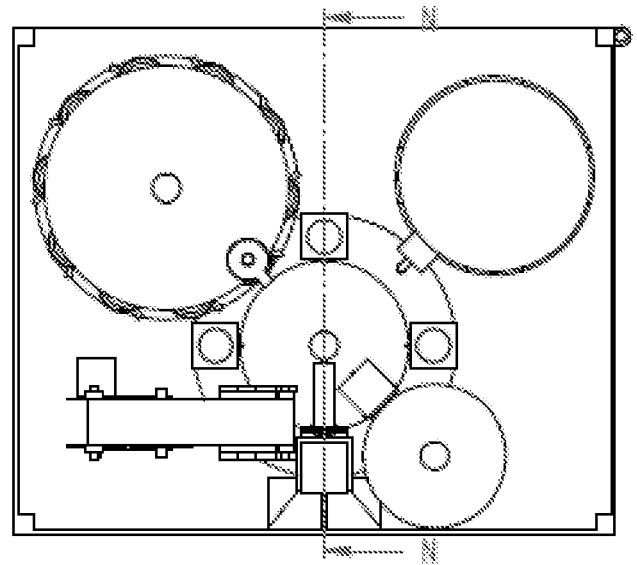
FIGS. 15A, 15B, 15C, 15D, 15E, and 15F show respectively a top schematic overview (FIG. 15A) of the alternative embodiment of the invention and where line N-N is a cross section line, the cross section being illustrated in FIG. 15B.
Figure 15B:
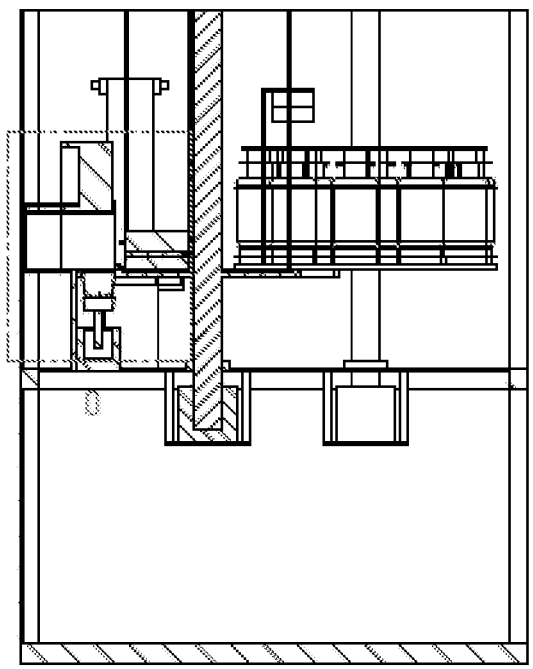
Figure 15C:
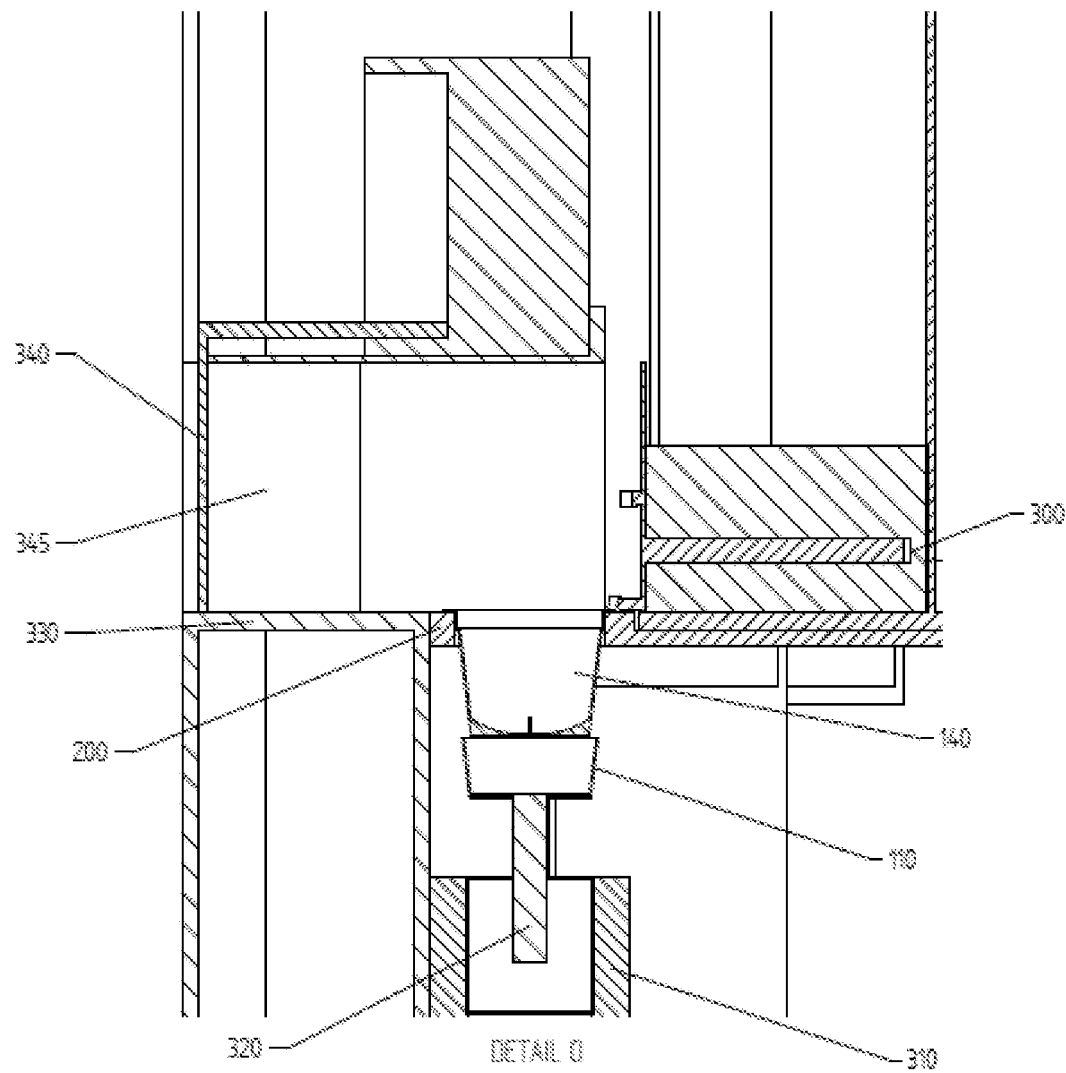

In FIGS. 15A to 15F, FIG. 15A shows a top schematic view of system 100A with a cross section taken through line N-N. FIG. 15B show the cross section line N-N which passes through the beverage receptacle carousal 200, dispensing port and beverage mixing arrangement and highlighted section O. FIG. 15C shows an expanded view of section O including the positioning of cup 140, held in the beverage receptacle carousal 200, and before it is captured by receptacle holder 110 and mixed. Also shown are the dispensing cavity 345, dispensing platform 330, dispensing window 340 (in its closed position) and dispensing arm 300. There is also shown a combined electric motor and vacuum assembly 310 and a drive shaft combination 320 comprising primary and secondary shafts 173 and 174 respectively (not shown) and substantially as described hereinbefore with reference to FIG. 2 and FIG. 5.

Figure 15D:
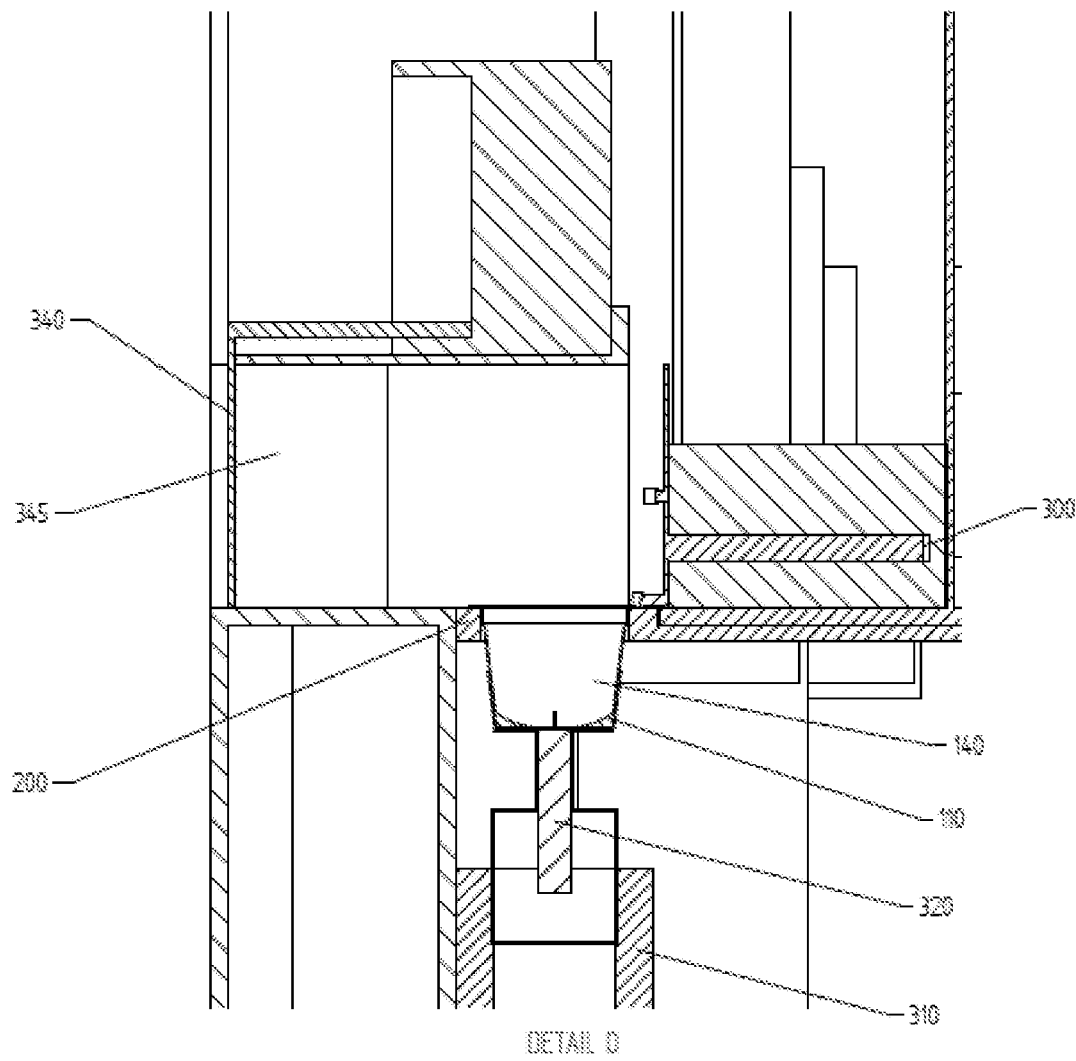

FIG. 15C shows the cup 140 in position to be received into beverage receptacle holder 110, and which is substantially as shown in FIG. 3. FIG. 15D shows the general engagement of cup 140 with receptacle holder 110 and which is attached, as per FIG. 2 or FIG. 5, to a central primary shaft 173 adapted to retain beverage receptacle holder 110 at the distal end thereof. Primary shaft 173 is a component part of drive shaft assembly 320. There is also provided as part of the drive shaft assembly 320 a secondary shaft 175 (not shown in FIGS. 15C to 15E, but in FIGS. 2 and 5), wherein the secondary shaft is fixedly attached to a rotating gear mechanism (not shown) which includes a rotor portion, clutch armature and gears and which is adapted to spin secondary shaft 175 at a desired rotation speed. As per FIG. 2 and FIG. 5, secondary shaft 175 is further attached to an electromagnetic coupler 176 adapted to selectively couple secondary shaft 175 to primary shaft 173. When rotation of the primary shaft 173 is required to mix the beverage ingredients in cup 140, current flows through electromagnet 176, which produces a magnetic field. The rotor portion of the clutch becomes magnetized and sets up a magnetic loop that attracts the armature. The armature is pulled against the rotor and a frictional force is generated at contact. Within a relatively short time, the load is accelerated to match the speed of the rotor, thereby engaging the armature and the output hub of the clutch. In most instances, the rotor and secondary shaft 175 are constantly rotating all the time.

FIG. 15D shows the engagement of sealed cup 140 with receptacle holder 110. When engaged with the receptacle holder 110 a vacuum is applied to maintain the cup in place and the cup 140 is spun at high revolution as previously described above, in order to thoroughly mix the fluid and dry ingredients. Typically this is between about 10 to 20 seconds although longer mixing times of between 20 to 30 seconds or 30 to 40 seconds or even up to 60 seconds may be required depending the nature of the ingredients to be mixed. Once the pre; determined spin cycle is complete the vacuum is released in order that the cup 140 is disengaged from but still held in receptacle holder 110.

Figure 15E:
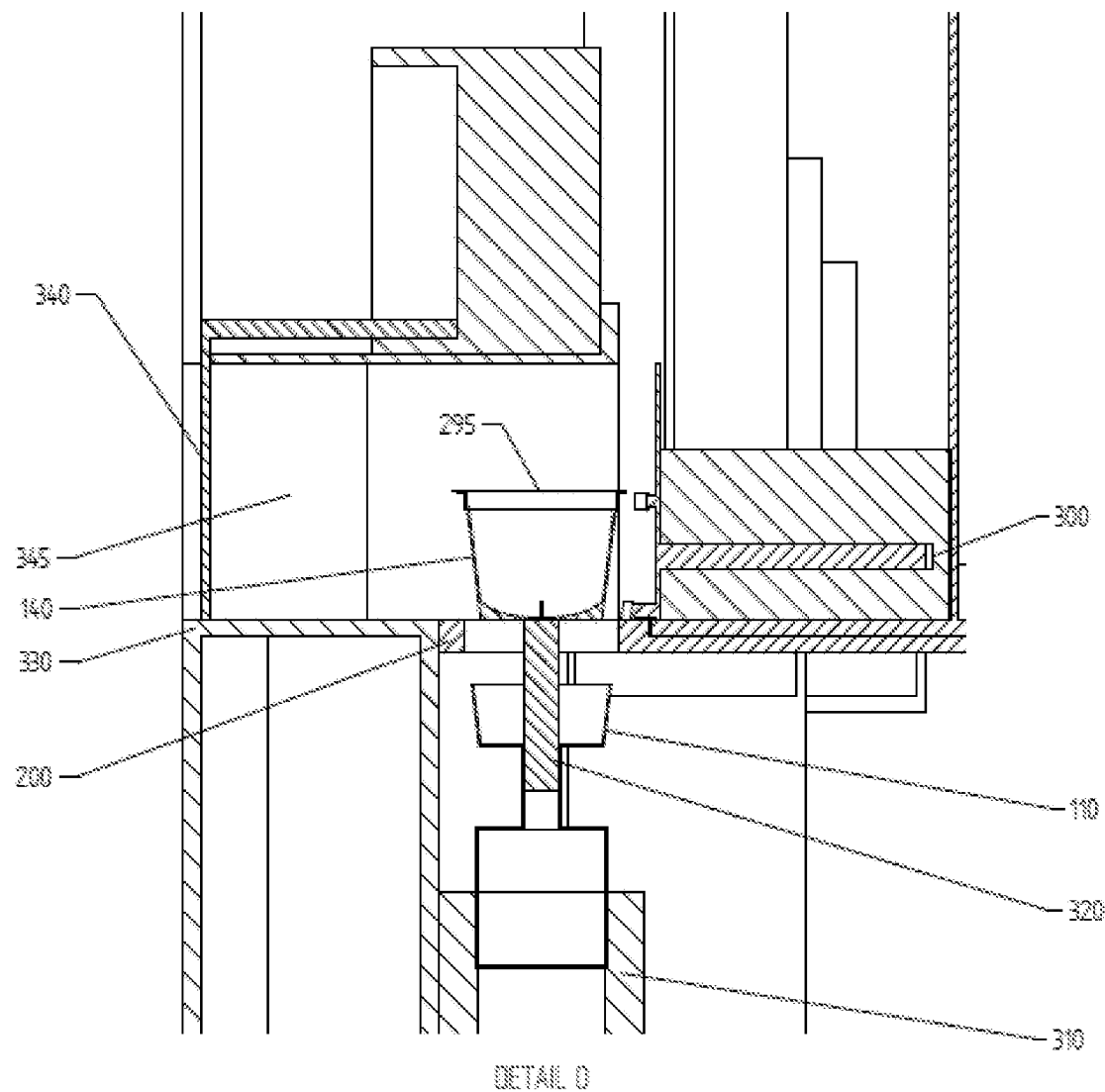
Figure 15F:
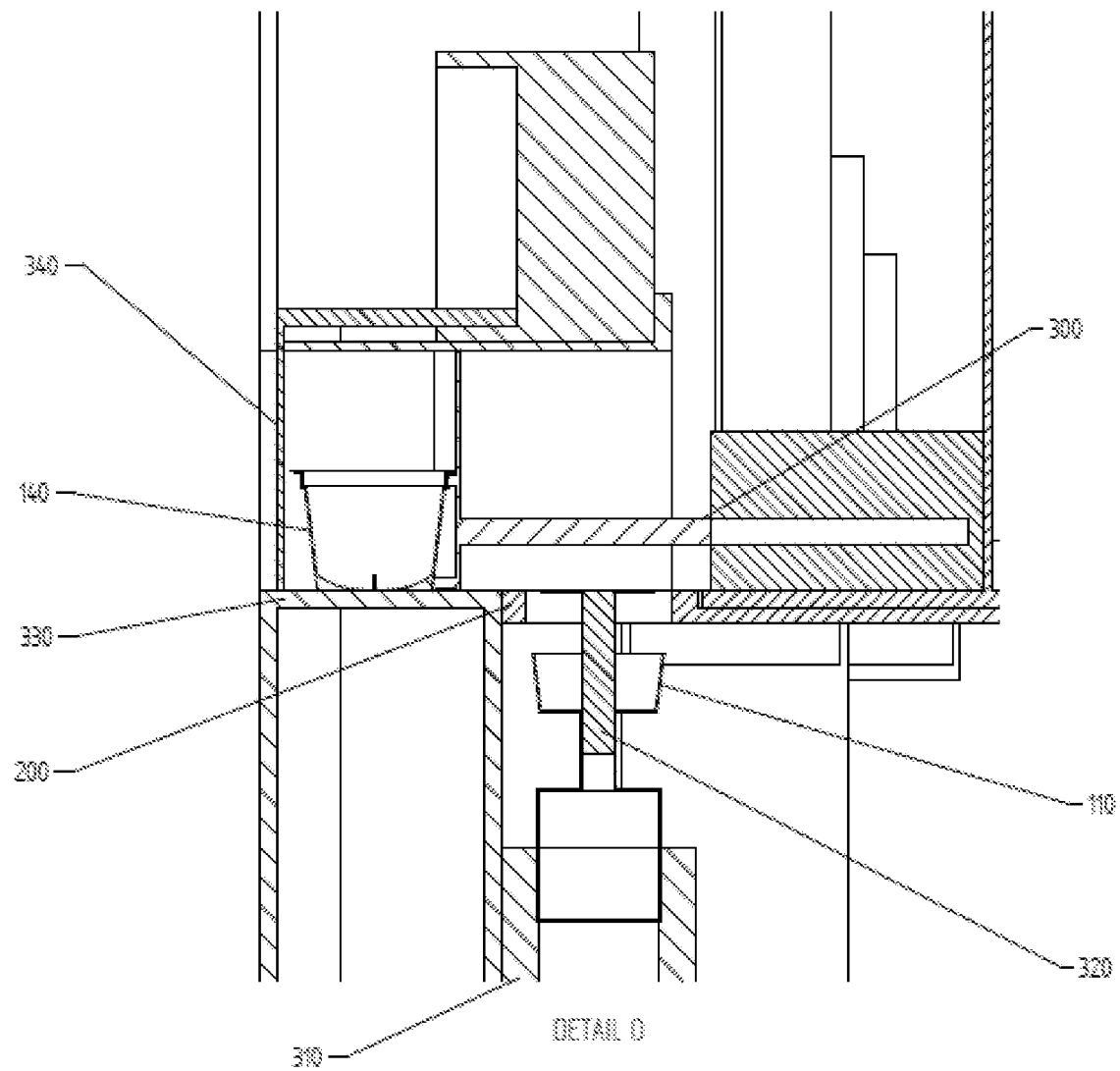

In FIG. 15E the cup 140 containing the mixed beverage is then upwardly projected by the primary shaft 173 or drive shaft combination 320 (combined primary shaft 173 and secondary shaft 175) to be displaced from the receptacle holder 110 and beverage receptacle carousal 200 into the dispensing cavity 345. In FIG. 15E the dispensing arm 300 is in its retracted position and the dispensing port window 340 is in the closed position. The upper surface of dispensing platform 330 is adapted to meet the upper surface of the beverage receptacle carousal 200 such that when dispensing arm 300 extends outwardly to move cup 140 on to the dispensing platform 330 there is a seamless transitioning of the cup from one surface to another so the cup 140 is not knocked over. When the cup is located within the dispensing cavity and the dispensing arm is 300 is fully retracted the dispensing window 340 then opens allowing the user to take their prepared beverage. The various operations of the dispensing system can be monitored and performed using sensor technology known to the skilled addressee.

As described above, it is apparent that systems 100 and 100A, provide systems for the selection and mixing of a dry mix beverage formulation and a fluid and dispensing a mixed liquid beverage according to the selected dry mix formulation.

INTERPRETATION

In accordance with:
As described herein, 'in accordance with' may also mean 'as a function of' and is not necessarily limited to the integers specified in relation thereto.

EMBODIMENTS

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Comprising and Including:
In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: "including" or "which includes" or "that includes" as used herein is also an open term that also means "including at least" the elements/features that follow the term, but not excluding others. Thus, including is synonymous with and means comprising.

Scope of Invention

Thus, while there has been described what are believed to be the preferred arrangements of the invention, those skilled in the art will recognize that other and further modifications may be made thereto without departing from the spirit of the invention, and it is intended to claim all such changes and modifications as fall within the scope of the invention. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the mobile device industries, specifically for methods and systems for distributing digital media via mobile devices.

It will be appreciated that the methods/apparatus/devices/ systems described/illustrated above at least substantially provide a an apparatus adapted for selection and mixing of a dry mix beverage formulation and dispensing a mixed beverage according to the selected dry mix formulation The systems disclosed herein, and/or shown in the drawings, are presented by way of example only and are not limiting as to the scope of the invention. Unless otherwise specifically stated, individual aspects and components of the systems may be modified, or may have been substituted therefore known equivalents, or as yet unknown substitutes such as may be developed in the future or such as may be found to be acceptable substitutes in the future. The systems disclosed herein may also be modified for a variety of applications while remaining within the scope and spirit of the claimed invention, since the range of potential applications is great, and since it is intended that the present systems be adaptable to many such variations.

The invention claimed is:

1. A system for dispensing individual servings of a beverage, said system comprising: a beverage receptacle holder adapted for retaining a beverage receptacle;
   a plurality of dry formulation beverage mixtures;
   a selection arrangement for selecting one or more of said beverage mixtures for said beverage;
   dispensing means for measuring an individual serving quantity of said selected one or more beverage mixtures and for depositing said individual serving quantity into said beverage receptacle;
   a fluid dispensing module for depositing an individual serving quantity of at least one selected fluid into said beverage receptacle;
   a sealing arrangement to seal said beverage receptacle; and
   a beverage mixing arrangement to mix said individual serving quantity of said beverage mixture and said fluid to provide a mixed beverage for dispensing; and
   wherein said beverage receptacle holder comprises a recess adapted to receive said beverage receptacle; and
   wherein said beverage receptacle holder further comprises an inner wall spaced from an outer wall, said inner wall comprising a plurality of apertures adapted for airflow through said inner wall into a space between said inner wall and said outer wall.

2. A system as claimed in claim 1, wherein said selection arrangement comprises a user interface.

3. A system as claimed in claim 2, wherein said user interface provides means for a user to select:
   (a) one or more of said beverage mixtures from a plurality of available beverage mixtures; and
   (b) at least one beverage fluid from a plurality of available fluids.

4. A system as claimed in claim 3, wherein said beverage mixtures are selected from the group consisting of one or more of a pre-workout beverage formulation, a post-workout beverage formulation, a flavouring and a powdered milk product.

5. A system as claimed in claim 3, wherein said beverage fluid comprises water.

6. A system according to claim 1, wherein the dispensing means for the plurality of dry formulation beverage mixtures includes dispensing canisters.

7. A system according to claim 6, wherein said dispensing canisters are adapted to dispense predetermined quantities of beverage mixtures to the beverage receptacle.

8. A system as claimed in claim 7, wherein said beverage receptacle holder is fluidly connected to a vacuum air pump adapted to draw air through said plurality of apertures in said inner wall of said beverage receptacle holder.

9. A system as claimed in claim 8, wherein, in use, said vacuum air pump is adapted to retain a beverage receptacle in said recess under vacuum pressure.

10. A system as claimed in claim 9, wherein, in use, said beverage receptacle within said recess is retained therein via vacuum pressure due to operation of said vacuum air pump.

11. A device adapted for beverage mixing comprising:
    a primary shaft, vertically disposed and adapted for high speed rotation or agitation about a central axis;
    a secondary shaft adapted to be selectively coupled to said primary shaft and adapted for high speed rotation or agitation about a central axis wherein the secondary shaft is concentrically disposed with respect to the primary shaft;
    a beverage receptacle holder, wherein said beverage receptacle holder comprises a recess adapted to receive said beverage receptacle;
    wherein, in use, said beverage receptacle holder is adapted to retain a beverage receptacle under vacuum suction, and said secondary shaft is adapted to rotate or agitate said beverage receptacle holder thereby to mix dry and fluid phase ingredients retained in said beverage receptacle to generate a mixed beverage; and
    wherein said beverage receptacle holder further comprises an inner wall spaced from an outer wall, said inner wall comprising a plurality of apertures adapted for airflow through said inner wall into a space between said inner wall and said outer wall.

12. The device as claimed in claim 11, wherein said secondary shaft is selectively magnetically coupled to said primary shaft.

13. The device as claimed in claim 11, wherein said secondary shaft is adapted to be coupled to said primary shaft with a selectable gearing ratio thereby to select the speed of rotation or agitation of said secondary shaft.

14. The device as claimed in claim 11, wherein the device further comprises a mixing arrangement located on one or more guiding tracks such that said mixing arrangement can be selectively moved into alignment with a dry phase ingredient dispensing apparatus and a fluid phase ingredient dispensing apparatus thereby to facilitate deposition of said dry and fluid phase ingredients into said beverage receptacle retained in said beverage receptacle holder and a sealing apparatus for sealing said beverage receptacle.

15. The device as claimed in claim 11, wherein said secondary shaft is adapted to move into a sealing position whereby said beverage receptacle retained in said beverage receptacle holder is placed into sealing engagement with a sealing arrangement.

16. The device as claimed in claim 15, wherein said secondary shaft is adapted to move vertically into said sealing position whereby said beverage receptacle retained in said beverage receptacle holder is placed into said sealing engagement with a sealing cap of said sealing apparatus.

* * * * *